US009840245B2

(12) United States Patent
Asano et al.

(10) Patent No.: US 9,840,245 B2
(45) Date of Patent: Dec. 12, 2017

(54) BRAKE CYLINDER DEVICE AND BRAKE DEVICE

(71) Applicant: Nabtesco Corporation, Tokyo (JP)

(72) Inventors: Yoshio Asano, Hyogo (JP); Hideyuki Oie, Kobe (JP)

(73) Assignee: Nabtesco Corporation, Tokyo (JP)

(*) Notice: Subject to any disclaimer, the term of this patent is extended or adjusted under 35 U.S.C. 154(b) by 0 days.

(21) Appl. No.: 14/782,498

(22) PCT Filed: Mar. 27, 2014

(86) PCT No.: PCT/JP2014/058709
§ 371 (c)(1),
(2) Date: Jan. 6, 2016

(87) PCT Pub. No.: WO2014/162960
PCT Pub. Date: Oct. 9, 2014

(65) Prior Publication Data
US 2016/0144843 A1 May 26, 2016

(30) Foreign Application Priority Data

Apr. 3, 2013 (JP) .................................. 2013-077431

(51) Int. Cl.
| F16D 55/08 | (2006.01) |
| B60T 17/08 | (2006.01) |
| B60T 1/00 | (2006.01) |
| B61H 1/00 | (2006.01) |
| F16D 49/16 | (2006.01) |

(Continued)

(52) U.S. Cl.
CPC ............ B60T 17/086 (2013.01); B60T 1/005 (2013.01); B61H 1/00 (2013.01); F16D 49/16 (2013.01);

(Continued)

(58) Field of Classification Search
CPC .. F16D 2125/40; F16D 2127/06; F16D 65/46; F16D 65/56; F16D 2125/06;

(Continued)

(56) References Cited

U.S. PATENT DOCUMENTS 3,255,676 A * 6/1966 Berg ...................... B60T 17/16
188/170
3,983,975 A * 10/1976 Wright .................. B60T 13/12
188/196 D (Continued)

FOREIGN PATENT DOCUMENTS

| JP | 199876 U | 7/1989 |
| JP | 423886 U | 2/1992 |

(Continued)

*Primary Examiner* — Anna Momper
*Assistant Examiner* — Mahbubur Rashid
(74) *Attorney, Agent, or Firm* — The Webb Law Firm

(57) ABSTRACT

A brake cylinder device having a parking spring brake mechanism, provided with a clutch mechanism configured so as to transmit or block urging force of a piston to or from a brake force transmitting unit; a latch member for restricting displacement of the brake force transmitting unit relative to the piston by engaging with the clutch mechanism, and allowing displacement of the brake force transmitting unit relative to the piston by disengaging from the clutch mechanism; a latch lock member for engaging at an inclined part with a protruding part of the latch member; and a rotation-preventing part for preventing the latch lock member from rotating.

4 Claims, 9 Drawing Sheets

(51) Int. Cl.
*F16D 63/00* (2006.01)
*F16D 65/06* (2006.01)
*F16D 121/08* (2012.01)
*F16D 125/40* (2012.01)
*F16D 125/66* (2012.01)
*F16D 127/06* (2012.01)
*F16D 129/02* (2012.01)

(52) U.S. Cl.
CPC ......... *F16D 63/006* (2013.01); *F16D 65/062* (2013.01); *F16D 2121/08* (2013.01); *F16D 2125/40* (2013.01); *F16D 2125/66* (2013.01); *F16D 2127/06* (2013.01); *F16D 2129/02* (2013.01)

(58) Field of Classification Search
CPC .... F16D 2127/02; F16D 28/00; F16D 63/006; B60T 13/746; B60T 17/16; B60T 17/086
USPC ......... 188/72.8, 74, 170, 203, 216; 475/298, 475/300, 138; 192/53.1
See application file for complete search history.

(56) References Cited

U.S. PATENT DOCUMENTS

| | | | | | |
|---|---|---|---|---|---|
| 4,063,491 | A * | 12/1977 | Roger | ................. | B60T 17/086 188/170 |
| 4,088,205 | A * | 5/1978 | Frania | ................. | F16D 65/56 188/196 D |
| 4,116,113 | A * | 9/1978 | Leclerc | ................. | B60T 17/08 188/170 |
| 4,230,021 | A * | 10/1980 | Aurousseau | ............ | B60T 15/18 91/461 |
| 4,478,319 | A * | 10/1984 | Casalone | ............. | B60T 17/083 188/170 |
| 4,567,965 | A * | 2/1986 | Woodruff | .............. | B64C 11/385 188/170 |
| 5,038,896 | A * | 8/1991 | Wirth | ................... | B60T 17/083 188/153 R |
| 6,435,321 | B1 * | 8/2002 | Asano | ..................... | F16D 65/14 188/170 |
| 6,702,072 | B2 * | 3/2004 | Asano | .................. | B60T 17/083 188/170 |
| 2003/0196859 | A1 * | 10/2003 | Asano | .................. | B60T 17/083 188/361 |
| 2005/0155827 | A1 * | 7/2005 | Huber, Jr. | ............... | B60T 17/08 188/170 |
| 2005/0173206 | A1 * | 8/2005 | Reuter | ................... | F16D 65/18 188/72.7 |
| 2008/0251327 | A1 * | 10/2008 | Huber | ..................... | B60T 17/16 188/33 |

FOREIGN PATENT DOCUMENTS

| | | |
|---|---|---|
| JP | 2001206213 A | 7/2001 |
| JP | 2010164193 A | 7/2010 |

* cited by examiner

US 9,840,245 B2

BRAKE CYLINDER DEVICE AND BRAKE DEVICE

CROSS-REFERENCE TO RELATED APPLICATIONS

This application is the United States national phase of International Application No. PCT/JP2014/058709 filed Mar. 27, 2014, and claims priority to Japanese Patent Application No. 2013-077431 filed Apr. 3, 2013, the disclosures of which are hereby incorporated in their entirety by reference.

TECHNOLOGY FIELD

This invention relates to brake cylinder devices with a parking spring brake mechanism used during car parking, and to brake devices equipped with the brake cylinder device.

BACKGROUND TECHNOLOGY

It is known that, in the past, for brake cylinder devices equipped with a parking spring brake mechanism used during car parking, the brake force of the parking spring brake was configured to be manually released. For example, in the brake cylinder device in Patent Documentation 1, a lock lever (latch member) with a protruding eye nut (pulling eye) is established on one end of the outward side from the cylinder body. The latch member uses the blade tip on the other end to engage with the latch blade of the sleeve member in the clutch means as a transmission mechanism, to regulate the relative position in relation to the second rod piston when the spring brake means is activated. Meanwhile, the latch member is configured so that manual operation pulls the pulling eye in the radial direction of the cylinder body, toward the outward side of the cylinder body, and the engagement between the latch member blade tip and the sleeve member latch blade is released. With this action, the Patent Documentation 1 brake cylinder device is configured so that relative displacement against the second rod piston of the ordinary brake means is allowed, the lock state of the spring brake means is released by the latch member, and the action of the spring brake means is released.

In addition, in the Patent Documentation 1, a brake cylinder device with configuration equipped with a slide pin (latch lock member) is disclosed. The latch lock member is a member for preventing the latch member from returning to its original position and entering a lock state after the pulling eye has been pulled and the lock state of the spring brake means has been released, causing the pulling eye to separate. In this brake cylinder device, the latch lock member is housed in an internal tube (guide part) so that it slides freely in the axial direction. In the latch lock member, an inclined surface that engages with another inclined surface (protruding part) formed on the latch member is formed. When the pulling eye is pulled, the engagement of the latch member protruding part with the inclined surface of the latch lock member is released, and the latch lock member drops. With this action, even if the pulling eye is separated after the lock state is released, the released state of the lock is maintained since the advance of the latch member is impeded by the latch lock member.

PRIOR ART DOCUMENTATION

Patent Documentation

Patent Documentation 1: Japanese Published Unexamined Application No. 2001-2062113

SUMMARY OF INVENTION

Issues to be Resolved by the Invention

However, if in the above-mentioned configuration, for some reason the latch lock member is rotated around the advance or retreat direction of the said latch lock member, the inclined part of the latch lock member can no longer engage with the protruding part of the latch member. If this happens, the latch member cannot perform normal operation.

This invention is intended to resolve the above-mentioned issue, and the objective is to ensure normal operation of the latch member.

Means for Resolving the Issue

The brake cylinder device related to the situation for this invention to attain the above-mentioned objectives is equipped with a cylinder, a piston housed in the said cylinder, and a parking spring biasing said piston so that said piston moves in the brake action direction, a parking spring brake mechanism used during car parking, a brake force transmission part that transmits the above-mentioned piston bias force to the brake output part applying pressuring force to the pressured part of the braking target, a clutch mechanism configured so that the above-mentioned piston bias force is transmitted to or shut off from the above-mentioned brake force transmission part, a latch member that is configured so that, when in an advanced state of advancing to the above-mentioned clutch mechanism side, the front tip engages the above-mentioned clutch mechanism, while in a retreated state of retreating from the above-mentioned clutch mechanism, engagement with the above-mentioned clutch mechanism of the above-mentioned front tip is released, and if the above-mentioned parking spring brake mechanism is activated in the above-mentioned advanced state, regulates the relative displacement versus the above-mentioned piston of the above-mentioned brake force transmission part, while if in the above-mentioned retreated state when the above-mentioned parking spring brake mechanism is activated, tolerates the relative displacement versus the above-mentioned piston of the above-mentioned brake force transmission part, a latch lock member having a sloped part positioned so that it contacts the tip of the protrusion part formed by said latch member so that it protrudes in the advanced direction of the above-mentioned latch member, and if the above-mentioned latch member is in a retreated state, advance in the above-mentioned brake action direction pressures the above-mentioned latch member in the retreat direction of the said latch member, a guide part for guiding the said latch lock member so that the above-mentioned latch lock member can advance and retreat, and a rotation prevention part for preventing rotation by the above-mentioned latch lock member around the advance and retreat direction of the said latch lock member in relation to the above-mentioned guide.

In this configuration, if the parking spring brake mechanism is activated when the latch member is in the advanced state, brake force by the parking spring brake is generated.

Meanwhile, if the latch member enters a retreated state when the parking spring brake mechanism is activated, the brake force by the parking spring brake is released. In other words, in this configuration, the brake force by the parking spring brake can be manually released by the latch member.

In addition, in this configuration, the latch lock member is established so as to allow advance and retreat in the brake action direction. If the latch member is in the retreated state, then this latch lock member advances in the brake activation direction, and the latch member is pressured on its inclined part in the retreat direction of the said latch member. In other words, the latch lock member is used to maintain this braking force in a released state after the parking spring brake force has been manually released.

Also, in this configuration, a rotation prevention part is established for preventing rotation by the latch lock member around the advance and retreat direction of the said latch lock member. This action can prevent rotation of the latch lock member occurring due to some cause that would lead to failure of engagement of the protruding part of the latch member with the inclined part of the latch lock member, and can avoid failure of the latch member from operating correctly.

Therefore, in this configuration, normal operation of the latch member can be ensured.

(2) Preferably, the braking device is equipped with a fall prevention part to prevent the above-mentioned latch lock member from falling from the above-mentioned guide part.

In this configuration, the latch lock member can be prevented from rotating, which is the cause of said latch lock member falling from the guide part. Therefore, normal operation of the latch member can be more firmly ensured.

(3) More preferably, the above-mentioned fall prevention part is positioned so that it overlays the said latch lock member in the advance and retreat direction of the above-mentioned latch lock member.

In this configuration, arraying the fall prevention part and latch lock member in series is prevented in the advance and retreat direction of the latch lock member. Therefore, the size of the brake cylinder device in the advance and retreat direction of the latch lock member can be made compact.

(4) Preferably, the braking cylinder is further equipped with a spring seat having a first clutch spring biasing the above-mentioned clutch mechanism in the direction of the above-mentioned brake action and in the opposite direction, in relation to the above-mentioned cylinder, a second clutch spring biasing the above-mentioned clutch mechanism in the direction of the above-mentioned brake action, in relation to the above-mentioned piston, a receiving part for receiving the tip of the side biasing the above-mentioned clutch mechanism in the above-mentioned second clutch spring, and an extending part established as the above-mentioned fall prevention part, to extend from the above-mentioned receiving part so as to oppose the tip on the retreat direction side of the above-mentioned latch lock member.

For example, if a fall prevention part is formed in the piston, when the piston advances in the brake activation direction, a situation where the fall prevention part pressures the latch lock member is quite possible. In other words, in cases where pressure on the latch lock member is not originally needed, there were concerns that the latch lock member would be pressured.

In response, in the above-mentioned configuration, since the extending part of the spring seat receiving the second spring is established as a fall prevention part, pressuring of the latch lock member by mistake due to the piston advanced status can be avoided. In other words, in this configuration, the fall prevention part can be established in a suitable position.

(5) In addition, to resolve the above-mentioned issue, the brake device applied to the situation in this invention is equipped with any of the above-mentioned brake cylinder devices, and with a brake output part that uses the above-mentioned brake cylinder device piston bias force to apply a pressuring force to the pressured part of the braking target.

In this configuration, a brake device where the latch member operates correctly can be provided.

DESCRIPTION OF THE INVENTION

The following is a description of the embodiments, with reference to the drawings. Note that this invention is not limited to the embodiments below and can be broadly applied in relation to brake cylinder devices with a parking spring brake mechanism used during car parking and brake devices equipped with that brake cylinder device.

Note that, in regards to the brake cylinder device and brake device in these embodiments, the description is for an example of a case used for railway cars. In addition, in these embodiments, the description is for an example of a form where the brake device is configured as a tread brake device, but it does not necessarily have to conform to this. In other words, this invention can be applied to brake devices other than tread brake devices, such as, for example, brake devices configured as disc brake devices.

First Embodiment

Entire Configuration

Figure 1:
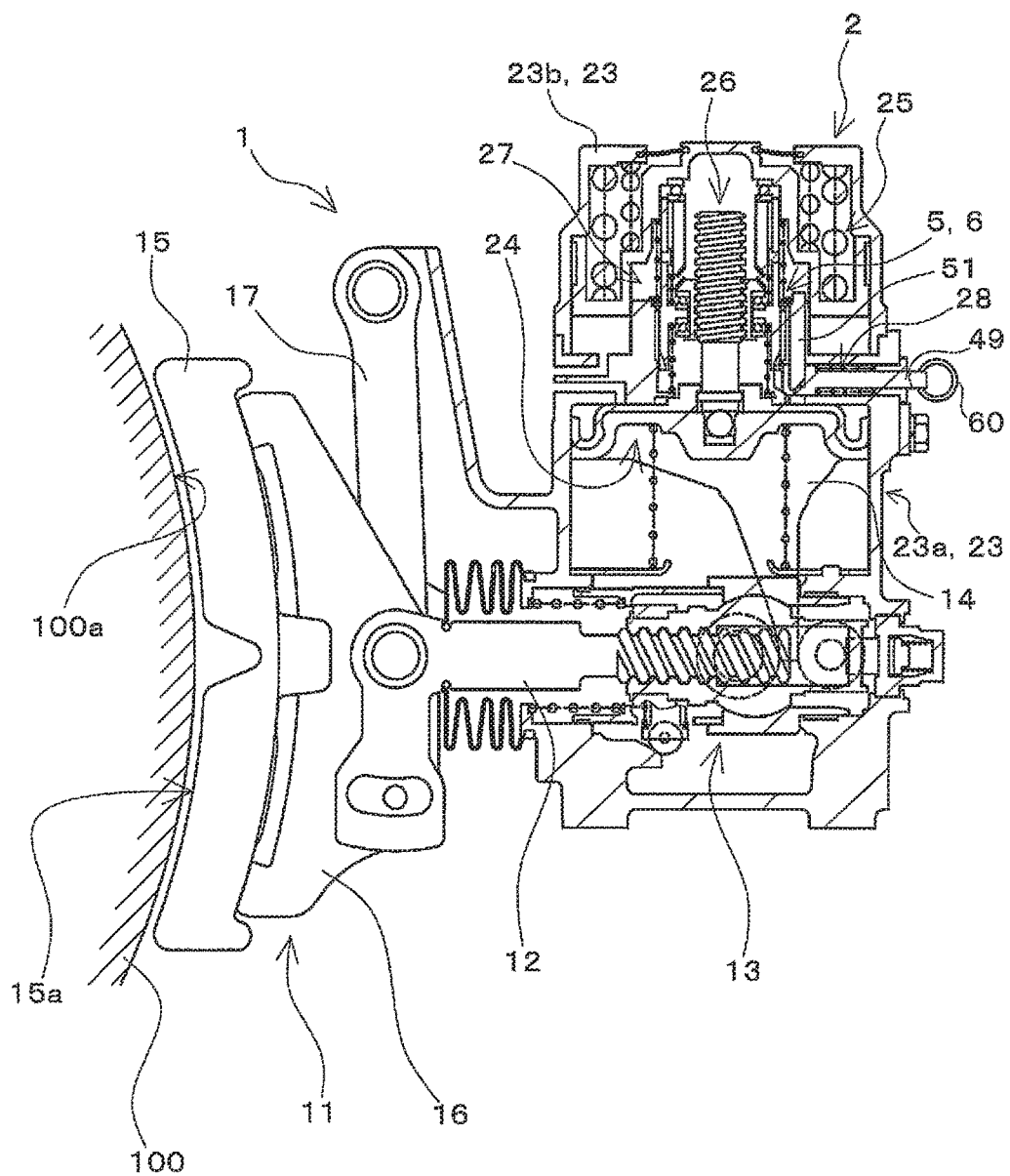
FIG. 1 Drawing including a partial cross-section of the brake device applied to the first embodiment of this invention.
Figure 2:
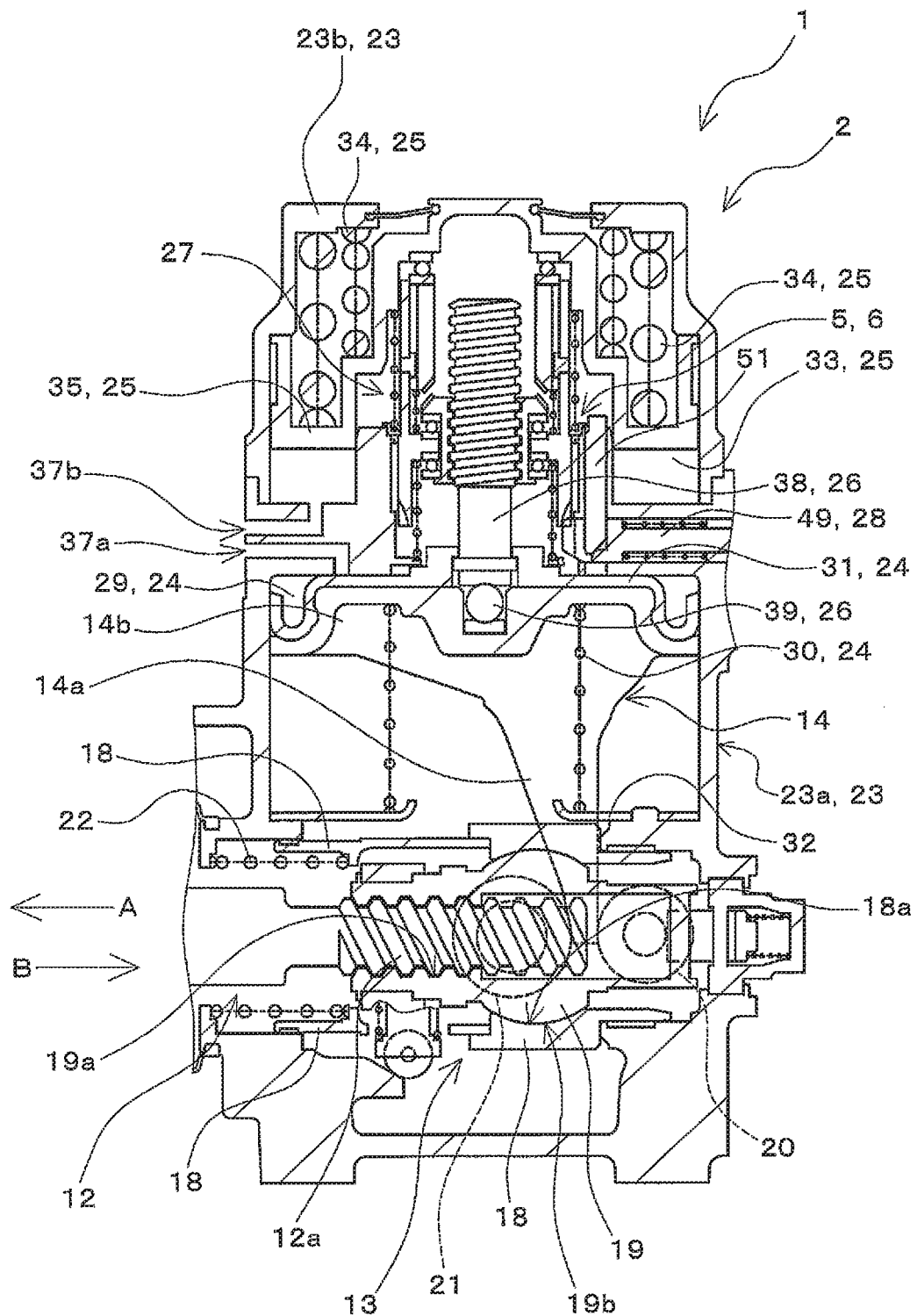
FIG. 2 Drawing showing an enlargement of part of the brake device shown in FIG. 1, and a drawing showing the brake cylinder device established in the brake device.

FIG. 1 is a drawing including a partial cross-section of the brake device applied to the first embodiment of this invention. Also, FIG. 2 is a drawing showing an enlargement of part of the brake device shown in FIG. 1, and a drawing showing the brake cylinder device established in the brake device. The brake device 1 shown in FIG. 1 and FIG. 2 is established in a car as a brake target (railway car in this embodiment) omitted from the drawings. Note that FIG. 1 is a drawing where the brake device 1 is in the state of being established in a railway car and the brake device is viewed from the wheel direction of a railway car wheel 100. The brake device 1 is configured as a tread brake device.

As shown in FIG. 1 and FIG. 2, the brake device 1 is configured equipped with a brake cylinder 2, a brake output part 11, a rod 12, and a rod support mechanism 13, etc. In addition, the brake device 1 is configured so that the brake cylinder 2 activates, the brake output part 11 is driven by the rod 12 supported by relative rotation capability against the brake cylinder 2 and outputs a braking force.

Note that the rod 12 is established so that it extends along a direction orthogonal to the wheel direction of the wheel 100. Meanwhile, the brake cylinder device 2 is established so that the axial direction of that cylinder body 23a and cover 23b extends along a direction approximately orthogonal to the extension direction of the rod 12. In addition, in this embodiment, the brake cylinder device 2 is established so that the axial direction of the cylinder body 23a and cover 23b extend along the vertical direction of the railway car where the wheel 100 is established.

The brake output part 11 is established as a brake shoe and the brake output part 11 is established so that it is linked to and driven by the rod 12, to output the brake force. In addition, the brake output part 11 is configured to be equipped with a lining 15 and a lining support part 16, etc.

In the lining 15, a brake surface 15a is established to be contactable to the wheel 100 tread surface 100a (pressured part). The brake output part 11 is driven by the rod 12, and the lining 15 brake surface 15a is pressed to contact the tread surface 100a of the wheel 100. In addition, the brake surface 15a is pressed against the tread surface 100a to generate friction, braking the wheel 100 rotation.

The lining support part 16 fixes to the lining 15 and is established as a member supporting the lining 15. In addition, the lining support part 16 is linked to freely swivel against the tip of the front tip side of the rod 12. Note that the front tip side of the rod 12 is positioned in a state protruding from the cylinder body 23a of the brake cylinder device 2. In addition, the lining support part 16 is linked to enable swiveling against a hanger member 17 linked to freely swivel against the cylinder body 23.

The rod 12 is driven in line with the cylinder brake 2 action and is established as an axial member transmitting output from the brake cylinder device 2 to the brake output part 11. The rod 12 moves in the direction protruding from the cylinder body 23a (FIG. 2 arrow A direction) in line with the action when the brake cylinder device 2 outputs the braking force. In this way, the rod 12 presses the lining 15 against the wheel 100 to generate brake force. In addition, the rod 12 moves in the direction retreating to the cylinder body 23a (FIG. 2 arrow B direction) in line with the action when the brake cylinder device 2 releases the brake force. In this way, the rod 12 separates the lining 15 from the wheel 100 to release the brake force.

In addition, the rod 12 uses the action of a fluid brake mechanism 24, described later, in the brake cylinder device 2 to move in the arrow A direction in FIG. 2. Furthermore, the rod 12 is configured so it is possible to be biased in line with the action of a parking spring brake mechanism 25, described later, in the brake cylinder device 2. Note that, in the brake cylinder device 2 of this embodiment, the action of the parking spring brake mechanism 25 is performed while the fluid brake mechanism 24 remains in an active state. In addition, in the state where the parking spring brake mechanism 25 has once been activated, the rod 12, regardless of the action state of the fluid brake mechanism 24, maintains a biased state due to bias force from the parking spring brake mechanism 25.

The rod support mechanism 13 is established in the interior of cylinder body 23a. This rod support mechanism 13 is established as a mechanism to support swiveling capability and displacement capability of the rod 12 against the cylinder body 23a. In addition, an outer case part 18, an inner case part 19, a fixed roller 20, a movable roller 21, and a return spring 22, etc, is equipped in the rod support mechanism 13.

The outer case part 18 is configured to be equipped with a cylindrical part and, in this embodiment, is configured with two cylindrical members combined in a series. An inner case part 19 and a front tip side and reverse side tip linked to the rod 12 brake output part 11, etc, are housed on the inner side of the outer side case part 18. In addition, the outer side case part 18 is supported for free slide movement along the rod 12 axial direction of the rod and in a parallel direction against the cylinder body 23a. Note that rod 12 is positioned no that the axial direction extends along a virtually orthogonal direction in relation to the wheel axial direction of the wheel 100.

The inner case part 19 is housed on the inner side of the outer case part 18. In addition, in the inner side case part 19, a screw hole 19a is established with a screw groove formed on the inner periphery for screwing into the outer circumference screw part 12a established on the outer circumference of the rod 12 front tip side and reverse side tip. Note that, in the rod support mechanism 13, a position adjustment mechanism is established to displace the relative position against the inner case part 19 of the rod 12 by displacing the screwing position in relation to the screw hole 19a of the outer circumference screw part 12a.

In addition, in the inner case part 19, a spherical outer circumference curved surface 19b is established so as to form part of a spherical surface on the outer circumference. In addition, in the outer case part 18, a free sliding inner circumference curved surface 18a is established against the outer circumference curved surface 19b of the inner case part 19. The inner circumference curved surface 18a is formed as a concaved spherical curved surface that forms part of a sphere and is configured as the curved surface of a curvature corresponding to the curvature of the outer circumference curved surface 19b. In the inner case part 19 and outer case part 18, a spherical bearing is configured by the rubbing of the outer circumference curved surface 19b and inner curved surface 18a. This spherical bearing is used to support the inner case part 19 swiveling freely against the outer side case part 18, and to support the rod 12 swiveling against the cylinder body 23a.

The fixed roller 20 is fixed in a relative position versus the cylindrical body 23a and is configured as a cylindrical roller supported for free rotation in the cylinder body 23a. The fixed roller 20 is, for example, established as a pair on both sides of the outer case part 18, in a direction orthogonal to the axial direction of the outer case part 18 that is in a parallel direction to axial direction of the rod 12.

The movable roller 21 is configured as a cylindrical roller supported for free rotation on the outer side against the wall part of the outer side case part 18. The movable roller 21 is, established as a pair on both sides of the outer case part 18, for example in a direction orthogonal to the axial direction of the outer side case part 18. In addition, each movable roller 21 is in a position where their outer circumference opposes each fixed roller 20, and is positioned to separate from each fixed roller 20.

Furthermore, the movable roller 21 rotates, and is supported for rolling and relative displacement capability against the cylinder body 23a. In addition, in the cylinder body 23a is established a guide (drawing omitted) for rolling the movable roller 21 in line with a direction that is virtually parallel with the axial direction of the rod 12. Note that, the movable roller 21 need not be supported to freely rotate at the outer case part 18. For example, an opening may be established in the outer side case part 18, and through that opening the movable roller 21 may be supported for free rotation against the inner side case part 19.

The return spring 22 is established as a coil spring so that the tip of one end contacts the stepped part of inner side of the cylinder body 23a, and the tip of the other end contacts the stepped part of the inner side of the outer side case part 18. In addition, the return panel 22 is positioned in a compressed state.

The return spring 22 is positioned as described above and is configured so as to bias the outer case part 18 in a direction (FIG. 2 arrow B direction) separating from the wheel 100 against the cylinder body 23a along a direction approximately parallel to the axial direction of the rod 12. The return spring 22 biases the outer case part 18 in a direction separating from the wheel 100 and, together with the outer case part 18, the inner case part 19 and the rod 12 screwed into it are biased in a direction separating from the wheel 100. The bias force of this return spring 22 is used to move the rod 12 in a direction retreating to the cylinder body 23a, in line with displacement of the rod drive part 14, described below, that accompanies activation when the brake cylinder device 2 releases the brake force.

If the first piston 31 and the rod drive part 14 move toward the rod support mechanism 13 in line with activation when the brake force of the brake cylinder device 2 is output, the fixed roller 20 and movable roller 21 operate as shown below. Specifically, the fixed roller 20 rotates at the same position against the cylinder body 23a, while the movable roller 21 is biased toward the wheel 100 side (toward the FIG. 2 arrow A direction) in line with the movement of the rod drive part 14.

Based on the above, the movable roller 21, while rotating, relatively moves toward the wheel 100 side while also rolling against the cylinder body 23a. In other words, in line with movement of the rod drive part 14, the wedge-shaped part 14a of the rod drive part 14 is used to drive the movable roller 21 so that the distance between the fixed roller 20 and movable roller 21 is widened. In addition, together with the movable roller 21, the outer case part 18, the inner case part 19, and the rod 12, move toward the wheel 100 side. With this action, the lining 15 of the brake output part 11 moves together with the rod 12 to contact the wheel 100 tread 100a, and the wheel 100 rotation is therefore braked.

[Brake Cylinder Device]

Figure 3:
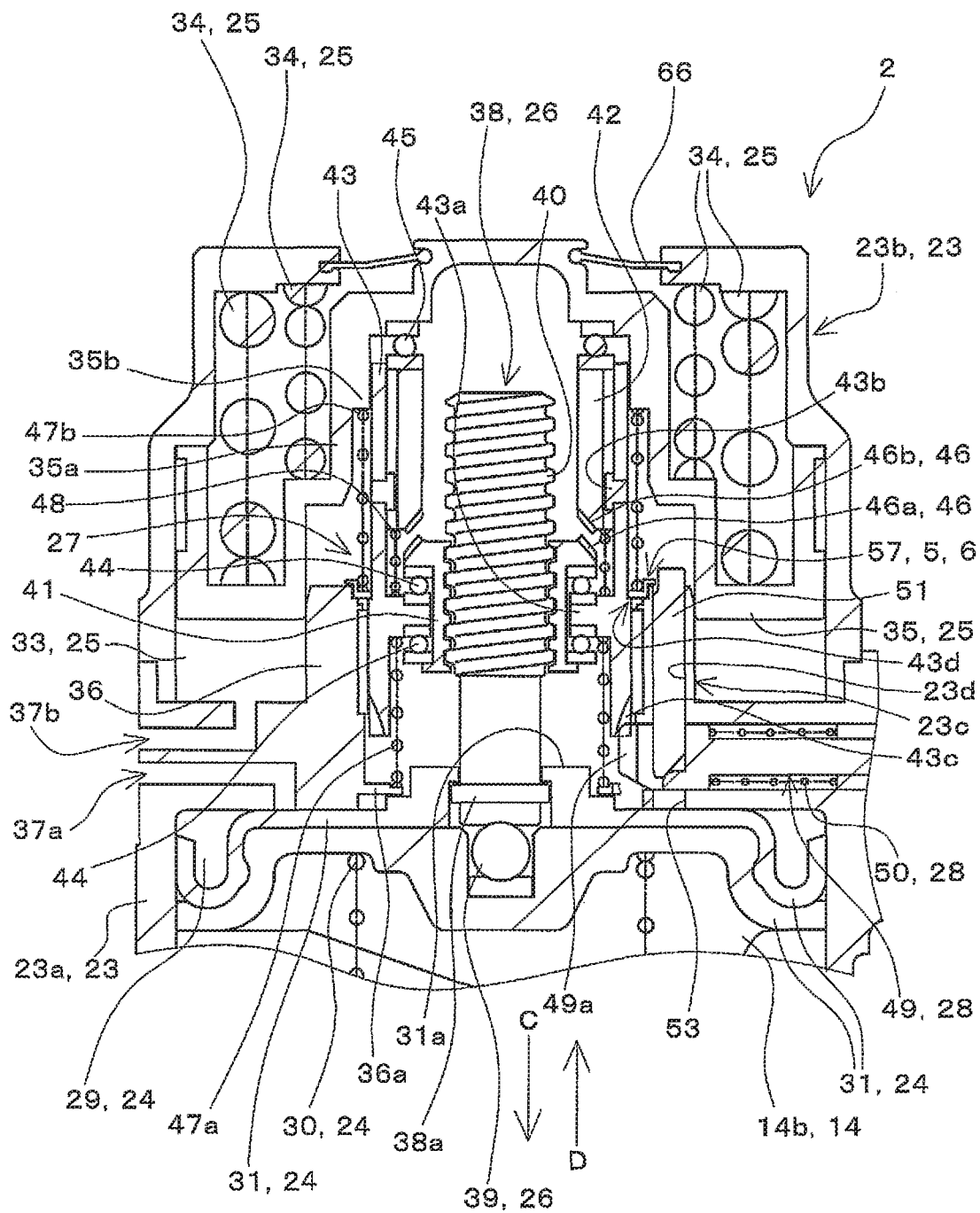
FIG. 3 Drawing showing an enlargement of part of the brake cylinder device shown in FIG. 2.

Next is a detailed description of the brake cylinder device 2. FIG. 3 is a drawing showing an enlargement of part of the brake cylinder device 2 shown in FIG. 2. The brake cylinder device 2 is in a state of incorporation into the brake device 1, and positioned in a railway car. In addition, as shown in FIG. 1 and FIG. 2, etc., the brake cylinder 2 is configured to equip a rod drive part 14, a cylinder 23, a fluid brake mechanism 24, a parking spring brake mechanism 25, an axle 26, a transmission mechanism 27 (clutch mechanism), and a lock mechanism 28, etc. Each of the above-mentioned mechanisms, etc., in the brake cylinder device 2 are, for example, formed from configuration elements using iron-based materials, and other metal materials, as the basic materials for the main configuration elements.

In addition, in this embodiment, the brake cylinder device 2 is configured so that activation is by compressed air, as a compressed fluid. In other words, the fluid brake mechanism 24 and the parking spring brake mechanism 25 are configured so as to activate from the supply and exhaust of compressed air as a compressed fluid body. In addition, the brake cylinder device 2 is configured as a device capable of activation of both the fluid brake mechanism 24 and the parking spring brake mechanism 25.

The cylinder 23 has a cylinder body 23a and a cover 23b. The cylinder body 23a has a portion shaped into a cylinder, and the inner side houses the fluid brake mechanism 24, the above-mentioned rod support mechanism 13, and the rod drive part 14, etc. In addition, the rod mechanism 28, the above-mentioned brake output part 11, and the above-mentioned rod 12, etc. are positioned in the cylinder body 23a. In addition, the cover 23b is fixed in the cylinder body 23a. Note that the inner side of the cover 23b houses the parking spring brake mechanism 25, the axle 26, and the transmission mechanism 27, etc.

In addition, the cylinder body 23a, for example, is fixed and positioned in the railway carriage. Note that the axial direction of the cylinder body 23a and cover 23b, the axial direction of the first piston 31 of the fluid brake mechanism 24, described below, the axial direction of the second piston 35 of the parking spring brake mechanism 25, described below, and the axial direction of the spindle 38 of the axle 26, described below, are configured in a matching direction or a mutually parallel direction.

In addition, in the cylinder body 23a are established the first port 37a and second port 37b. The first port 37a is connected to the first compressed air supply source (drawing omitted) as a pressurized fluid source. The second port 37b is connected to the second compressed air supply source (drawing omitted) which is a pressurized fluid source.

The compressed air (pressurized fluid) supplied from the first compressed air supply source is supplied from the first port 37a by way of the brake control device (drawing omitted) that is activated based on commands from a higher level controller (drawing omitted). In addition, compressed air supplied from the first port 37a to inside the cylinder body 23a is exhausted by way of the above-mentioned brake control device based on commands from the above-mentioned controller. In addition, the compressed air (pressurized fluid) supplied from the second compressed air supply source is supplied from the second port 37b by way of a parking spring brake control solenoid valve (drawing omitted) that is activated based on commands from the above-mentioned controller. In addition, compressed air supplied from the second port 37b to inside the cylinder body 23a is exhausted by way of the above-mentioned parking spring brake control solenoid valve based on commands from the above-mentioned controller.

The fluid brake mechanism 24 is activated by supply or exhaust of compressed air as pressurized fluid. This fluid brake mechanism 24 is established as an ordinary brake mechanism used for brake operation when operating railway cars. In addition, the fluid brake mechanism 24 is configured to equip a first pressure chamber 29, a first spring 30, and a first piston 31, etc.

The first pressure chamber 29 is formed by division inside the cylinder body 23a by the first piston 31. In addition, the first pressure chamber 29 is supplied with compressed air sent from the above-mentioned first compressed air supply source, by communicating with the first port 37a. Also, the compressed air supplied to the first pressure chamber 29 is exhausted from the first port 37a.

The first spring 30 is positioned in a region inside the cylinder body 23a divided by the first piston 31, and is positioned by way of the first piston 31 so as to be opposing the first pressure chamber 29. In this embodiment, the first spring 30 is established as a coil spring biasing the first piston 31 that was positioned in a compressed state inside the cylinder body 23a. In addition, the first spring 30 is positioned so that the tip on one end side contacts the first piston 31 to bias this first piston 31. In addition, the first spring 30 is supported so that the tip on the other end side contacts a spring receiving plate 32 fixed to the inner wall of the cylinder body 23a.

The first piston 31 is positioned to freely reciprocate within the cylinder body 23a parallel to the axial direction, and also positioned to freely slide against the inner wall of the cylinder body 23a. In addition, with compressed air supplied from the first port 37a to the first compression chamber 29 the first piston 31 is configured so as to move in resistance to bias force by elastic recovery of the compressed first spring 30. Therefore, the fluid brake mechanism 24 is configured to have the first piston 31 activating in opposition to the first pressure chamber 29 and the first spring 30 and compressed air supplied to the first pressure chamber 29 so that the first piston 31 moves in the prescribed brake activation direction (FIG. 3 arrow C direction) in resistance to the bias force of the first spring 30.

In addition, the rod drive part 14 is fixed to the first piston 31 on the opposite side to the first pressure chamber 29 side. With this action, if the first piston 31 moves in the above-mentioned brake activation direction, the rod drive part 14 moves together with the first piston 31 in that brake activation direction. In addition, with the rod drive part 14 moving together with the first piston 31 in the brake activation direction, the rod 12 is driven by the above-mentioned rod support mechanism 13. With this action, brake force is output from the brake output part 11 driven by the rod 12.

The rod drive part 14 is established as a member (brake force transmission part) driving the rod 12 by the rod support mechanism 13 in connection with the advance and retreat of the first piston 31. The rod drive part 14 is housed within the cylinder body 23a. In addition, the rod drive part 14 is established as a wedge having a wedge-shaped part 14a formed into a wedge. Also, the rod drive part 14 is fixed to the first piston 31, in the base tip 14b from which the wedge-shaped part 14a protrudes.

The wedge-shaped part 14a is established so as to protrude from the base tip 14b toward the rod support mechanism 13. In addition, the wedge-shaped part 14a is formed into a wedge shape with the narrowed tip coming from the base tip 14b toward the rod support mechanism 13 side. The tip side of the wedge-shaped part 14a, or in other words, the side opposite to the base tip 14b side in the wedge-shaped part 14a, is positioned in a state of insertion between the fixed roller 20 and movable roller 21. In addition, the tip side inserted between the fixed roller 20 and movable roller 21 in the wedge-shaped part 14a is positioned so that it comes in contact with the outer circumference of the fixed roller 20 and the outer circumference of the movable roller 21. Note that the wedge-shaped part 14a may also be established in multiple numbers in response to each combination of fixed roller 20 and movable roller 21. In addition, the wedge-shaped part 14a may also have one established in response to any one combination of the multiple combinations of the fixed roller 20 and movable roller 21.

If the first piston 31 and rod drive part 14 move toward the rod support mechanism 14, in line with action when the brake cylinder device 2 brake force is output, the fixed roller 20 contacting the wedge-shaped part 14a rotates in the same position in relation to the cylinder body 23a. Meanwhile, the movable roller 21 contacting the wedge-shaped part 14a is biased (toward the FIG. 2 arrow A direction) by the wedge-shaped part 14a toward the wheel 100, in line with movement by the rod drive part 14.

The parking spring brake mechanism 25 is established as a brake mechanism for parking, used to maintain the brake state when parking railway cars. In addition, the parking spring brake mechanism 25 is configured to be equipped with a second pressure chamber 33, a second spring 34 (a parking spring), and a second piston 35 (piston).

The second pressure chamber 33 is formed by division inside the cover 23b by the second piston 35. In addition, the second pressure chamber 33 is supplied with compressed air sent from the above-mentioned second compressed air supply source, by communication with the second port 37b. In addition, compressed air supplied to the second pressure chamber 33 is exhausted from the second port 37b The second spring 34 is positioned in a region inside the cover 23b divided by the second piston 35, and is positioned by way of the second piston 35 so as to be opposing the second pressure chamber 33. In this embodiment, the second spring 34 is established as a coil spring biasing the second piston 35 that is positioned in a compressed state inside the cover 23b. In addition, the second spring 34 is supported so that the tip of one end side contacts the inner wall of the tip of the cover 23b. In addition, the second spring 34 is positioned so that the tip of the other end side contacts the second piston 35, so as to bias the second piston 35. In addition, in this embodiment, multiple (two) of the second spring 34 are established. In addition, multiples of the second spring 34 are positioned in concentric shapes centering on the same central axis line. Note that, from the above, the cover 23b is established so as to internally house the second spring 34 with the parking spring, and the second piston 35 with the parking piston.

The second piston 35 is positioned to freely reciprocate within the cover 23b, parallel to that axial direction, and also positioned to freely slide against the inner wall of the cover 23b. The second piston 35 is established to be capable of movement in the same direction as the first piston 31. In addition, with compressed air supplied from the second port 37b to the second compression chamber 33, the second piston 35 is configured so as to move in resistance to bias force by elastic recovery of the compressed second spring 34, in the brake release direction (FIG. 3 arrow D direction), a direction opposite to the above-mentioned brake activation direction. Meanwhile, the second piston 35 is configured to have the compressed air supplied to the second pressure chamber 33 exhausted by way of the second port 37b, so as to move in the prescribed brake activation direction (FIG. 3 arrow C direction) using the bias force of the second spring 34.

As described above, the second piston 35 is configured so as to activate counter to the second pressure chamber 33 and the second spring 34. In addition, the parking spring brake mechanism 25 is configured so as to activate from the movement from the state of compressed air being supplied to the second pressure chamber 33 to a state of being exhausted, and from the biased second piston 35 moved in the brake activation direction using the bias force of the second spring 34.

Note that the tip opposed to the second compression chamber 33 in the second piston 35 is formed as a ring-shaped tip stretching in line with the circumferential direction of the cover 23b. In addition, an inner side cylindrical part 36 formed in a ring shape in line with the circumferential direction in the inner side of the ring-shaped tip of the second piston 35 is established in the cylinder body 23a. In addition, the ring-shaped tip of the second piston 35 is positioned so as to slide against the inner wall of the cover 23b, and also to slide against the outer circumference of the inner side cylindrical part 36.

In addition, a guide part 23c formed in a cylindrical shape is formed in the above-mentioned inner side cylindrical part 36 formed in the cylinder body 23a. The guide part 23c is formed by passing a portion of the circumferential direction in the inner side cylindrical part 36 through a through-hole 23d in the axial direction. This through-hole 23d is formed so that the cross-section shape perpendicular to the axis becomes circular. An approximately bar-shaped latch lock pin 51, to be described in detail later, is housed in this through-hole 23d. Also, a relief hole 53 is formed in the lower portion of the above-mentioned guide part 23c in the cylinder body 23a. The relief hole 53 is formed to a size enabling insertion of the latch lock pin 51.

The axle 26 is configured to be equipped with a spindle 38 and a bearing 39, etc. In addition, the axle 26 is established so as to be linked to the first piston 31 at the tip of the spindle 38, and to perform displacement together with the first piston 31.

The spindle 38 is positioned on the fixed side versus the first piston 31 so that the rod drive part 14 protrudes toward the brake activation direction, and on the opposite side, protrudes toward the brake release direction. This spindle 38 is established as an axial-shaped member formed independently of the first piston 31. In addition, the spindle 38 is configured so that the bias force from a transmission mechanism 27 to be described later, and from the parking spring brake mechanism 25, is transmitted to the first piston 31.

In addition, the spindle 38 has established a convex-shaped stepped part 38a stretching in a circumferential direction along the outer circumference in the tip of the side linked to the first piston 31. In addition, a concave area is established in the center area in the radial direction of the first piston 31 and a spindle holding part 31a formed in a fringe shape that engages the stepped part 38a is established in the inner circumference of this concave area. When the first piston 31 moves in the brake activation direction, the spindle holding part 31a in the first piston 31 engages with the stepped part 38a in the tip of the spindle 38, and biases the spindle 38 in the brake activation direction.

The bearing 39 is, for example, established as a ball-shaped member, and configured as a bearing receiving a thrust load used in the spindle 38 caused by the bias force from the parking spring brake mechanism 25. In addition, the bearing 39 is positioned in the above-mentioned concave area established in the central area of the first piston 31, and positioned in a state of contact with both the tip of the spindle 38 and the first piston 31. The bias force from the parking spring brake mechanism 25 is transmitted to the first piston 31 by way of the transmission mechanism 27, described below, the spindle 38, and the bearing 39.

The transmission mechanism 27 is established as a mechanism for transmitting the bias force in the brake activation direction of the second piston 35 in the parking spring brake mechanism 25, to the axis 26 that is displaced together with the first piston 31. The transmission mechanism 27 is configured to be equipped with a screw part 40, a clutch wheel 41, a clutch sleeve 42, and a clutch box 43, etc.

Note that the transmission mechanism 27 is positioned on the inner side in the radial direction of the second piston 35. In the second piston 35, an inner side cylindrical part 35a dividing a cylindrical region into the fluid brake mechanism 24 side and an opposite side in a state closed to the outside is established in the radical direction of the inner side. In addition, a portion of the transmission mechanism 27 is positioned in a cylindrical region on the inner side of the inner side cylindrical part 35a.

The screw part 40 is established as a male screw area formed on the outer circumference of the side linked to the first piston 31 in the spindle 38, and the area on the opposite side. The clutch wheel 41 is established in the female screw area formed in the inner circumference, as a cylindrical nut member screwed into the screw part 40, and positioned in a concentric shape centering on the same central axis line against the spindle 38. In addition, the clutch wheel 41 is supported to freely rotate against the clutch box 43 in the inner side of the clutch box 43 formed in a cylindrical shape, by way of a pair of bearings 44. With this action, in line with the relative motion with the spindle 38 and the clutch box 43, the clutch wheel 41 is configured to enable rotation and relative displacement in the axial direction against the spindle 38, while changing the relative screwing position against the screw area 40.

The clutch sleeve 42 is formed into a cylindrical shape, and is supported for free sliding motion against the clutch box 43 in the inner side of the clutch box 43, along a direction parallel to the axial direction of the spindle 38. The tip in the clutch sleeve 42 brake activation direction (tip of the first piston 31 side) is positioned to oppose the tip in the clutch ball sleeve 42 brake release direction (tip on the opposite side of the first piston side). The tip in the clutch sleeve 42 brake release direction, or in other words, the tip in the opposite direction to the side opposing the clutch wheel 41 of the clutch sleeve 42 is supported against the tip of the inner side cylindrical part 35a in the second piston 35, by way of a bearing 45 established as a thrust bearing. The bearing 45 supports the capability of rotation of the tip of the clutch sleeve 42 centering on the central axis line of the spindle 38 against the second piston 35.

A rotation stopping mechanism 46 configured with uneven tooth 46a and uneven tooth 46b is established in the clutch sleeve 42 and clutch wheel 41. The uneven tooth 46a is formed at the tip on the side opposing the clutch sleeve 42 in the clutch wheel 41 and is established across the circumferential direction of the tip of the clutch wheel 41. The uneven tooth 46b is formed at the tip on the side opposing the clutch wheel 41 in the clutch sleeve 42, and is established across the circumferential direction of the tip of clutch sleeve 42. The uneven tooth 46a and uneven tooth 46b, by coming into contact with the mutually opposing clutch wheel 41 tip and clutch sleeve 42 tip, are formed as mutually interlocking shaped teeth.

If the second piston 35 moves in the brake activation direction, and relatively moves against the spindle 38, the clutch sleeve 42 also relatively moves together with the second piston 25 against the spindle 38. In addition, the clutch sleeve 42 contacts the clutch wheel 41 screwed into the spindle 38, and the uneven tooth 46a and uneven tooth 46b interlock. The clutch sleeve 42 has its displacement in the rotation direction regulated, with only the axial direction displacement enabled against the clutch box 43. As a result, when the uneven tooth 46a and uneven tooth 46b interlock, the clutch wheel 41 relative rotation against the clutch box 43 can be regulated and stopped.

The clutch box 43 is established as a cylindrical member positioned on the inner side of the screw part 40, the clutch wheel 41, and the clutch sleeve 42. The clutch box 43 is supported to slide and enable displacement along a direction parallel to the axial direction of the spindle 38, versus the inner circumference of the inner side cylindrical part 36 and the inner circumference of the inner side cylindrical part 35e. In addition, in a state where the latch member 49 of the lock mechanism, described below, is not engaged, the clutch box 43 is supported to slide and enable rotation displacement even in the circumferential direction against the inner circumference of the inner side cylindrical part 36 and the inner circumference of the inner side cylindrical part 35a.

In addition, in the inner side of the clutch box 43, a stepped part 43a is established, stretching along the inner circumference, and maintains the clutch wheel 41 in free rotation through the pair of bearings 44 mounted on this stepped part 43a. In addition, in the inner side, the clutch box 43 supports free slide movement of the clutch sleeve 42 along a parallel direction to the axial direction of the spindle 38. Note that the tip of the protrusion part 43b protruding to the inner side from the inner circumference of the clutch box 43 is fitted to freely slide against the groove formed on the outer circumference of the clutch sleeve 42, and slide motion directions is guided against the clutch box 43 of the clutch sleeve 42. In addition, the relative position versus the cylinder body 23a and the second piston 35 of the clutch box 43 is adjusted by two position adjustment springs 47a, 47b biasing the clutch box 43 in mutually reversed directions. In addition, between the stepped part 43a of the clutch box 43 and the tip of the clutch sleeve 42, a separating spring 48 is positioned for biasing uneven tooth 46a and uneven tooth 46b in mutually separating directions.

The position adjustment springs 47a, 47b include a first position adjustment spring 47a for biasing the clutch box 43 in the brake release direction (FIG. 3 arrow D direction), and a second position adjustment spring 47b for biasing the clutch box 43 in the brake activation direction (FIG. 3 arrow C direction).

For the first position adjustment spring 47a, one edge side contacts a ring part 36a extending in an inward direction from the brake activation direction side in the inner circumference of the inner side cylindrical part 36, while the other end side contacts the stepped part 43a of the clutch box 43. With this action, the first position adjustment spring 47a biases the clutch box 43 in the brake release direction against the cylinder 23.

For the second position adjustment spring 47b, one edge side contacts a stepped part 35b formed in the inner circumference side of the inner side cylindrical part 35a, while the other end side contacts a spring seat 57 mounted on a stepped part 43d, formed on the outer circumference side of the clutch box 43. With this action, the second position adjustment spring 47b biases the clutch box 43 in the brake activation direction against the second piston 35. Note that a chamfered part 35c is formed on the inner circumferential fringe part of the inner side cylindrical part 35a (see FIG. 4). This chamfered part 35c is for prevention of damage or rubbing of the second position adjustment spring 47b caused by catching on the inner circumferential fringe part of the inner side cylindrical part 35a when the second position adjustment spring 47b buckled.

Figure 4:
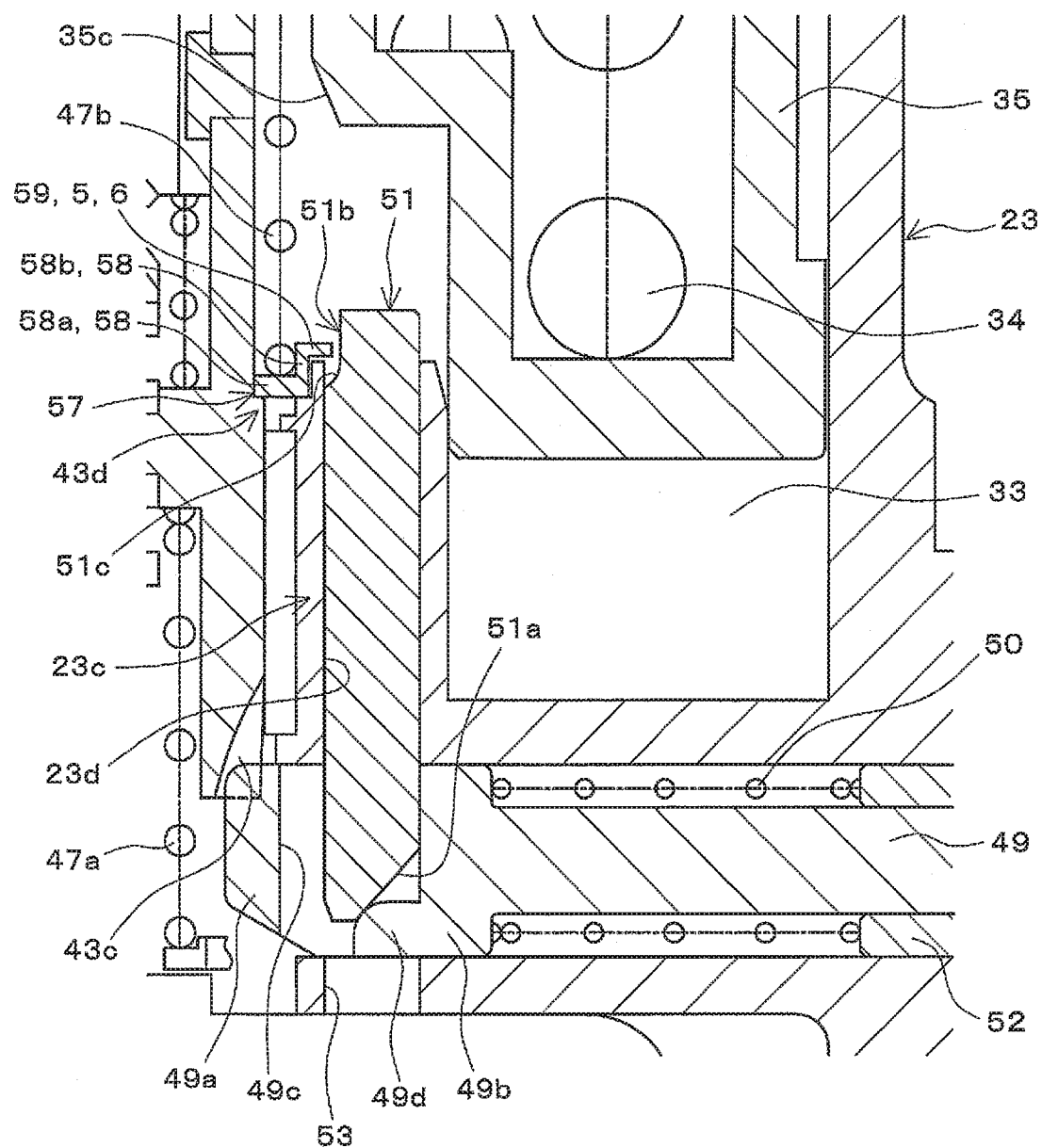
FIG. 4 Drawing showing enlargement of part of FIG. 3, and enlarged drawing of the area around the lock mechanism.

FIG. 4 is a drawing showing enlargement of part of FIG. 3. As described above, the spring seat 57 is mounted on the stepped part 43d. The spring seat 57 has a receiving part 58 and extension part 59, and these are formed into an integrated unit.

The receiving part 58 has a ring part 58a and a standing part 58b. The ring part 58a has an inner circumferential fringe that is formed in a ring shape fitting into the stepped part 43d. The standing part 58b is formed in a short cylindrical shape that extends from the outer circumferential fringe in the ring part 58a to the brake release direction side. The tip of the brake activation direction side in the second position adjustment spring 47b contacts the surface of the brake release direction side in the receiving part 58. The extension part 59 is formed in a flange shape extending from the tip in the standing part 58b to the radial direction outer side. The extension part 59 is established as a rotation prevention part 5 and fall prevention part 6, to be described in detail below.

As shown in FIG. 1, the lock mechanism 28 has a latch member 49 with one end side protruding from the cylinder 23 to the outer side. In addition, the lock mechanism 28 is configured as a mechanism where the other end side (forward tip) of the latch member 49 engages with the latch box 43 of the transmission mechanism 27, which regulates the relative displacement against the second piston 35 of the axis 26 when the parking spring brake mechanism 25 is activated, and assumes a locked state with the parking spring brake mechanism 25 remaining activated. In addition, the lock mechanism 28 is further configured to also be equipped with a latch bias spring 50 and a latch lock pin 51 (latch lock member), etc.

The latch member 49 is positioned no that the long direction is aligned in a direction orthogonal to the axial direction of the cylinder 23, or in other words, to extend in line in the radial direction of the cylinder 23. In addition, the latch member 49 is supported against the cylinder 23, to enable slide movement along the radial direction of the cylinder 23. The latch member 49 is enabled to switch between an advancing state of slide movement along the radial direction of the cylinder 23, and moved in the direction advancing toward the transmission mechanism 27 side (advancing direction), and a retreated state moving in the direction retreating from the transmission mechanism 27 side (retreating direction).

In addition, the latch member 49 is positioned in a state where the tip on the retreating direction side protrudes from the cylinder 23 to the outer side. Note that the portion of the retreating direction side in the latch member 49 is mounted on the cylinder 23, and supported by the retainer member 52 that prevents the latch member 49 from falling onto the outer part of the cylinder 23 of the latch member 49.

In addition, the latch member 49 has established an engagement blade 49a on the front end of the tip on the advancing direction side, for engaging a latch blade 43c established in the latch box 43. The latch blade 43c is established as a blade for interlocking and engaging with the engagement blade 49a of the latch member 49. In addition, the latch blade 43c is established in a multiple array along the outer circumference of the tip in the brake activation direction of the clutch box 43.

In addition, the latch blade 43c and engagement blade 49a are configured so that the blade tip extends along a parallel direction to the axial direction of the spindle 38. In addition, the engagement blade 49a engages any of the latch blades 43c, to maintain a state where the relative rotation of the clutch box 43 against the cylinder 23 has been stopped.

In other words, the rotation within the cylinder 23 of the clutch box 43 centering on the spindle 38 center axis line is regulated by engagement with the latch blade 43*c* and engagement blade 49*a*. In addition, as long as the engagement with the latch blade 43*c* and engagement blade 49*a* is not released, the clutch box 43 rotation stopped state is maintained.

The latch bias spring 50 is established as spring biasing the latch member 49 toward the inner side of the cylinder 23. The latch bias spring 50 is established as a coil spring positioned in the circumference of the latch member 49 in a compressed state in the long direction (advancing and retreating direction) of the latch member 49. In addition, for the latch bias spring 50, the tip of the advancing direction is positioned in the advanced direction side of the latch member 49, and the tip of the retreating direction side is positioned on the retreating direction side of the latch member 49. For more detail, the tip of the retreating direction side of the latch bias spring 50 is supported to contact the retainer member 52 mounted on the cylinder 23. In addition, the tip of the retreating direction side of the latch bias spring 50 is supported to contact a stepped part 49*b* of the latch member 49.

As shown above, the latch bias spring 50 is configured so as to bias the latch member 49 toward the clutch box 43 side (advancing direction side) against the cylinder 23. In other words, the latch bias spring 50 is configured so as to bias the engagement blade 49*b* of the latch member 49 in a direction that engages with the latch blade 43*c* of the clutch box 43.

In addition, in the tip of the retreating direction side in the latch member 49, a pull wheel 60 used for manually releasing activation of the parking spring break mechanism 25 is established (see FIG. 1). The pull wheel 60 is operated by an operator pulling toward the outer side, and the latch member 49 is drawn toward the outer side in resistance to the bias force of the latch bias spring 50 to release the engagement with the engagement blade 49*a* and latch blade 43*c*.

The latch lock pin 51 is established as a pin-shaped member, and housed in the through-hole 23*d* of the guide part 23*c*. With this action, the latch lock pin 51 is supported for free slide movement along the parallel direction to the axial direction of the spindle 38 against the guide part 23*c*. Note that, in this embodiment, the axial direction of the cylinder 23, the axial direction of the spindle 38, and the long direction of the latch lock pin 51, are set to orient toward the up and down directions, or in other words, the vertical direction. Note that the axial direction of the cylinder 23, the axial direction of the spindle 38, and the long direction of the latch lock pin 51, are not limited to this, and may be set in any orientation.

In addition, for the latch lock pin 51, the tip side in the brake activation direction, or in other words, the lower tip side, is inserted into a through-hole 49*c* established in the latch member 49. The through-hole 49*c* of the latch member 49 is formed so that the latch member 49 passes through along the parallel direction to the axial direction of the spindle 38 in the advancing direction side of the latch member 49.

In addition, in the latch member 49, a protrusion-shaped push-up part 49*d* (protruding part) is established protruding in the advancing direction of the said latch member 49 from the retreating direction side area in the inner wall of the through-hole 49*c*. In addition, in the tip in the brake activation direction of the latch lock pin 51, a tapered surface 51*a* (inclined part) is established spreading in an inclined direction against the axial direction of the spindle 38. The latch member 49 is housed inside the guide part 23*c* so that this tapered surface 51*a* is oriented in an obliquely downward direction (retreating direction and downward direction of the latch member 49). In other words, the tapered surface 51*a* is positioned to enable contact with the push-up part 49*d* within the through-hole 49*c* of the latch member 49.

Figure 5:
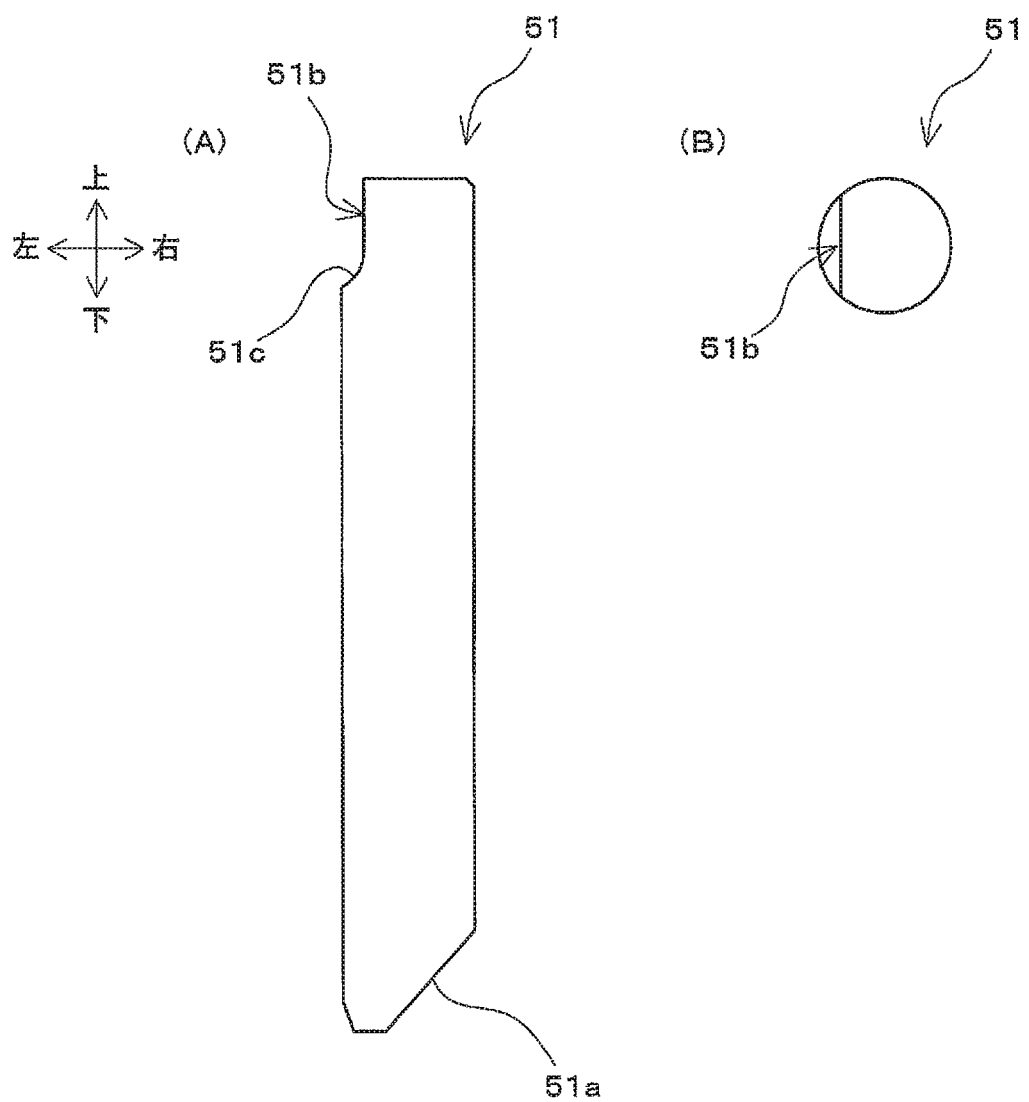
FIG. 5 Drawing for description of the shape of the latch lock pin with (A) a front view drawing and (B) a top view.

FIG. 5 is a drawing for the description of the shape of the latch lock pin 51, with (A) a front view, and (B) a top view. As shown in FIGS. 5(A) and (B), a notch part 51*b* is formed in the latch lock pin 51. The notch part 51*b* is formed by the upper left side portion in FIG. 5(A) by being resectioned. In other words, the notch part 51*b* is the tip of the opposite side to the axial direction (brake activation direction) in the latch lock pin 51, and is formed on the opposite side to the tapered surface 51*a* in the left-right direction (the advanced direction side of the latch member 49 where the state of the latch lock pin 51 is housed in the guide part 23*c*).

In a lock mechanism 28 configured as mentioned above, when the latch member 49 is in a state biased by the latch bias spring 50 to move toward the latch box 43 (when the latch member 49 is in an advanced state), it enters a state where the push-up part 49*d* pushes the tapered surface 51*d* upward. Therefore, at this time, the latch lock pin 51 enters a state of retreating in the retreating direction from the latch member 49 side.

Meanwhile, if the pull wheel 60 is pulled, the latch member 49 resists the bias force of the latch bias spring 50, and move in a direction (retreating direction) separating from the clutch box 43, to entero retreating state. If so, the latch lock pin 51 drops the prescribed distance and advances to the latch member 49 side and the lower tip established by the tapered surface 51*a* in the latch lock pin 51 enters a state of insertion into the relief hole 53. Note that the tip of the latch lock pin 51 inserted into the relief hole 52 is supported to contact the first piston 31.

In addition, the latch lock pin 51 is positioned to enable contact against the tip in the brake release direction when the parking spring brake mechanism 25 is in an activated state, or in other word, the ring-shaped tip established in a stepped shape against the inner side cylindrical part 35*a* of the second piston 35 in the upper tip. Note that, in the state where the parking spring brake mechanism 25 is activated, the second spring 34 biases the second piston 35, so that when the lock mechanism 28 is in either state, the locked state or the lock-released state, the upper tip of the latch lock pin 51 comes in contact with the second piston 35. In addition, in the state where the lock mechanism 28 has been once released after the parking spring brake mechanism 25 has been activated, and the lower tip is in a state of insertion into the relief hole 35, the latch lock 51 enters a state where the upper tip is in contact with the second piston 35.

From the above, even if the pull wheel 60 has been pulled, and the pull wheel 60 became separated after the locked state of the lock mechanism 28 was released, the latch lock pin 51 is prevented from being pushed back upward. In other words, even if the push-up part 49*d* of the latch member 49 transmitting the bias force of the latch bias spring 50 biases the tapered surface 51*a*, the latch lock pin 51 is prevented from being pushed upward. With this action, the move of the latch member 49 toward the clutch box 43 is obstructed by the latch lock pin 51. In addition, engagement of the latch member 49 engagement blade 49*a* to the latch blade 43*c* of the clutch box 43 is obstructed.

The transmission mechanism 27 and lock mechanism 28 are configured as mentioned above. With this action, activating the parking spring brake mechanism 25 links with the spindle 38 and the second piston 35, through the transmission mechanism 27. In other words, if moved from a state of compressed air being supplied to the second compression chamber 33 to a state of exhausting, and the parking spring brake mechanism 25 is activated, the bias force of the second spring 34 is used to move the second piston 35 together with the clutch sleeve 42 against the spindle 38. In addition, if the second piston 35 is moved against the spindle 38, the uneven tooth 46b of the clutch sleeve 42, and the uneven tooth 46a of the clutch wheel 41 interlock. With this action, the clutch wheel 41 rotation is stopped and enters a linked state linking with the spindle 38 and the second piston 35. Note that the parking spring brake mechanism 25 activation is performed with the fluid brake mechanism 24 in an activated state. In other words, when the compressed air of the first compression chamber 29 is supplied, and the fluid brake mechanism 24 is in an activated state, compressed air is exhausted from the second compression chamber 33, and the parking spring brake mechanism 25 activates.

In addition, as shown above, when the parking spring brake mechanism 25 is activated, and in a state of linkage with the spindle 38 and the second piston 35, if the lock mechanism 28 is in a locked state, the latch member 49 of the lock mechanism 28 is engaged with the transmission mechanism 27. With this action, the lock mechanism 28 is configured so as to regulate the relative position against the second piston 35 of the spindle 38, and put in a locked state while the parking spring brake mechanism 25 remains activated.

In other words, the engagement blade 49a of the latch member 49 biased by the latch bias spring 50 is engaged with the latch blade 43c of the clutch box 43, and rotation against the second piston 35 of the clutch box 43 and the cylinder 23 is regulated. In addition, the rotation of the clutch sleeve 42 against the clutch box 43 is regulated by engagement with the protrusion part 43b of the clutch box 43, and the grooves of the clutch sleeve 42. Furthermore, with interlocking of the uneven tooth 46b and uneven tooth 46a, the relative rotation with the clutch wheel 41 and clutch sleeve 42 is regulated, and the relative rotation against the clutch wheel 41 of the spindle 38 is also regulated.

In this way, the lock mechanism 28 is configured so that the relative displacement against the second piston 35 of the spindle 38 is regulated, by way of the transmission mechanism 27, and is in a locked state while the parking spring brake mechanism 25 remains activated.

[Configuration of Rotation Prevention Part and Fall Prevention Part]

The brake cylinder device 2 applied to the first embodiment is equipped with a rotation prevention part 5. The rotation prevention part 5 is intended to prevent the latch lock pin 51 from rotating around the advance or retreat direction of the said latch lock pin 51 against the guide part 23c. In this embodiment, the rotation prevention part 5 is configured with an extension part 59 of the spring seat 57.

The extension part 59, as shown above, is formed in a flange shape extending from the tip in the standing part 58b to the radial direction outer side. As shown in FIG. 4, a slight gap is formed in the radial direction between the outer fringe of the extension part 59, and the notch part 51b of the latch lock pin 51 in a state of housing in the guide part 23c. In addition, for the extension part 59, the surface in the brake activation direction side is the tip of the retreating direction side in the latch lock pin 51, or specifically, opposing in the axial direction, the portion 51c exposed toward the retreating direction side in the notch area 51b.

In addition, the brake cylinder device 2 applied to this embodiment is equipped with a fall prevention part 6. In the same way as the rotation prevention part 5, the fall prevention part 6 is configured in the extension part 59. In other words, in this embodiment, the rotation prevention part 5 and fall prevention part 6 are configured with the same configuration elements. The fall prevention part 6 is intended for preventing the latch lock pin 51 from falling from the guide part 23c. In addition, as shown in FIG. 4, the extension part 59 is positioned as the fall prevention part 6 so as to overly the latch lock pin 51 in the axial direction.

[Device Operation]

Next is a description about operation of the brake device 1 and the brake cylinder device 2. FIG. 1 shows the brake device 1 and brake cylinder device 2 in a loosened state without operation of either the fluid brake mechanism 24 or the parking spring brake mechanism 25. For example, when brake operation has not been performed during railway car operation, it enters a state as shown in FIG. 1. In this state, the above-mentioned brake control device (drawing omitted) is used to control so that supply of compressed air from the first compressed air supply source (drawing omitted) to the first compression chamber 29 by way of the brake control device and the first port 37a, is not performed. In addition, the compressed air inside the first compression chamber 29 is naturally exhausted by way of the brake control device and first port 37a. For this reason, the first piston 31 is biased in the brake release direction (FIG. 3 arrow D direction) by the first spring 30 inside the cylinder body 23a, and the first piston 31 is in a state of contact with the inner side wall of the cylinder body 23a, and with the wall part dividing the first pressure chamber 29.

Meanwhile, in the state shown in FIG. 1, based on control of the above-mentioned parking spring brake control solenoid valve (drawing omitted), compressed air is supplied from the second compressed air supply source (drawing omitted) to the second compression chamber 33, by way of the parking spring brake control solenoid valve and the second port 37b. For this reason, through use of bias force based on utilization of compressed air supplied to the second compression chamber 33, the second piston 35 is in a state moving in the brake release direction in resistance to the second spring 34 bias force. In this state, the uneven tooth 46a of the clutch wheel 41 and the uneven tooth 46b of the clutch sleeve 42 do not interlock, leading to a state forming a blank interval.

Meanwhile, based on control of the above-mentioned brake control device, compressed air from the first compressed air supply source is supplied to the first pressure chamber 29 by way of the first port 37a, to activate the fluid brake mechanism 24. At this time, through use of bias force based on utilization of compressed air supplied to the first compression chamber 29, the first piston 31 moves in the brake activation direction (FIG. 3 arrow C direction) in resistance to the bias force of the first spring 30. With this action, the first piston 31, together with the rod drive part 14, as well, moves in the brake activation direction. With this action, the movable roller 21 is biased by the wedge-shaped part 14a of the rod drive part 14 toward the wheel 100 side while separating from the fixed roller 20. In addition, the movable roller 21, together with the outer side case part 18, the inner side case part 19, and the rod 12, moves toward the wheel 100 side. With this action, the lining 15 of the brake output part 11, moving together with the rod 12 contacts the tread surface 100a of the wheel 100, and rotation of the wheel 100 is braked.

In addition, for the above-mentioned operation, the first piston 31 and also the spindle 38 moves in the brake activation direction, while the clutch wheel 41 is screwed into the screw part 40 established in the spindle 38. However, when the spindle 38 moves together with the first piston 31 in the brake activation direction, the clutch wheel 41 is supported to freely rotate at the bearing 44 against the clutch box 43. For this reason, the clutch wheel 41 rotates around the spindle 38, in line with the spindle 38 movement in the brake activation direction. With this action, only the spindle 38 moves in the brake activation direction.

Next is a description about activation of the parking spring brake mechanism 25. The parking spring brake mechanism 25 is used in a state where the fluid brake mechanism 24 is activated, and the railway car is completely stopped. In addition, the parking spring brake mechanism 25 activation is performed with the fluid brake mechanism 24 remaining in an activated state. In other words, in a state where compressed air is supplied to the first pressure chamber 29 and the first piston 31 is biased in the brake activation direction, activation of the parking spring brake mechanism 25 is started.

Based on control by the above-mentioned parking spring brake control solenoid valve, the parking spring brake mechanism 25 activates when compressed air is exhausted from the second compression chamber 33, by way of the second port 37b and the parking spring brake control solenoid valve. If the compressed air supplied to inside the second compression chamber 33 is exhausted by way of the second port 37b and the parking spring brake control solenoid valve, the second piston 35 moves in the brake activation direction due to bias force of the second spring 34. If the second piston 35 moves in the brake activation direction, the clutch sleeve 42 also moves with the second piston 35 in the brake activation direction. In addition, the clutch sleeve 42 contacts the clutch wheel 41, and the uneven tooth 46a of the clutch wheel 41 and the uneven tooth 46b of the clutch sleeve 42 interlock.

In the above state, the engagement blade 49a of the latch member 49, and the latch blade 43c of the clutch box 43, are engaged, and the relative rotation against the cylinder body 23a of the clutch box 43 is regulated. Furthermore, relative rotation of the clutch sleeve 42 against the clutch box 43 is regulated. For this reason, interlocking the uneven tooth 46a and uneven tooth 46b can regulate the rotation of the clutch wheel 41 against the cylinder body 23a, by way of the clutch box 43 and clutch sleeve 42. With this action, the rotation of the clutch wheel 41 is stopped and it enters a state of linkage with the spindle 38 and the second piston 35. In addition, in this state, the lock mechanism 28 leads to a locked state where locking occurs while the parking spring brake mechanism 25 remains in an activated state. In this locked state, the braking state for the wheel 100 rotations, or in other words, the parking spring brake mechanism 25 activated state, is maintained. Note that, in states where the parking spring brake mechanism 25 has once been activated, supply of compressed air to the first pressure chamber 29 is not performed, and a state is entered where compressed air is steadily exhausted from the first pressure chamber 29.

Next is a description about the brake device 1 activation when the locked state of the lock mechanism 28 is released. Release of the locked state of the lock mechanism 28 is, for example, performed in cases where compressed air is supplied to the second pressure chamber 33, and slight movement of the parked position of the railway car by towing car is desired, without going so far as to release the activation of the parking spring brake function 25.

If performing release of the locked state, a pulling operation of the pull wheel 60 is performed by an operator. With this action, the engagement blade 49a of the latch member 49 is separated from the latch blade 43c of the clutch box 43, and the latch member 49 engagement against the clutch box 43 is released.

If engagement of the engagement blade 49a of the latch member 49 and the latch blade 43c of the clutch box 43 is released, the clutch box 43 enters a state of relative rotation capability against the cylinder 23. In other words, the clutch box 43, the clutch sleeve 42 engaged at the protrusion part 43b against the clutch box 43, and the clutch wheel 41 interlocked against the clutch sleeve 42 by way of the uneven teeth 46a, 46b, enter an integrated state, and a state with relative rotation capability against the cylinder 23.

The state where the clutch box 43, the clutch sleeve 42, and the clutch wheel 41 have relative rotation capability against the cylinder 23 leads to a state of release of linkage with the spindle 38 and the second piston 35. In other words, a state is entered where relative rotation against the spindle 38 and the second piston 35 is allowed. In addition, in the above state, compressed air is not supplied to the first compression chamber 29. For this reason, the bias force of the first spring 30 biasing the first piston 31 causes the first piston 31 and the spindle 38 to move in the brake release direction. In addition, along with movement of the spindle 38 in the brake release direction, the clutch box 43, the clutch sleeve 42, and the clutch wheel 41 rotate against the cylinder 23, and the movement of the spindle 38 in the brake release direction becomes allowed.

As shown above, manual operation to pull the pull wheel 60 allows relative displacement against the second piston 35 of the spindle 38, and the locked state of the parking spring brake mechanism 25 is released by the lock mechanism 28. With this action, activation of the parking spring brake mechanism 25 can be manually released.

In addition, in the state as shown above where the locked state is released, the latch member 49 enters a retreated state, and engagement of the push-up part 49d of the latch member 49 and the tapered surface 51a of the latch lock pin 51 is released. Therefore, the latch lock pin 51 drops through the through-hole 49c of the latch member 49 to advance to the latch member 49 side and enter a state where the advance tip is inserted into the relief hole 53. In addition, along with the advance of this latch lock pin 51, the second piston 35 biased by the second spring 34 advances in the brake activation direction and contacts the surface of the retreating direction side in the latch lock pin 51. With this action, the latch lock pin 51 is pressured from the retreating direction side by the second piston 35. Therefore, even if the pull wheel 60 becomes separated, the latch lock pin 51 is prevented from being pushed and returned to the upward direction.

[Operation of Rotation Prevention Part and Fall Prevention Part]

However, in the brake cylinder device listed in the above-mentioned Patent Documentation 1, there is the possibility of the latch lock pin rotating or falling from the guide part for some reason. Specifically, for example, in cases where, due to installation space circumstances in the car, the parking spring brake mechanism is positioned so as to be higher than the fluid brake mechanism, it would be easy for the latch lock pin to rotate or fall. If such happens, there would be cases where the tapered surface of the latch lock pin no longer engages with the push-up part of the latch member, and the latch lock pin would fail to operate correctly.

Specifically, if there is no engagement between the tapered surface and the push-up part, for example, in cases where the latch lock pin is inserted into the relief hole, after which the lock mechanism is again returned to the locked state, this would make pushing up the latch lock pin in the push-up part difficult.

In response to this, the brake cylinder device 2 applied to this embodiment is, as described above, equipped with a rotation prevention part 5 having an extension part 59. With the rotation prevention part 5, even if the latch lock pin 51 is rotated, the outer fringe of the extension part 59 contacts the notch part 51*b* of the latch lock pin 51, restricting rotation of the latch lock pin 51. With this action, rotation of the latch lock pin 51 is prevented. As a result, even if, for example, the latch lock pin 51 has fallen from the guide part 23*c* for some reason, when the latch lock pin 51 is again housed in the guide part 23*c*, the tapered surface 51*a* correctly engages with the push-up part 49*d*.

[Effects]

As described above, in the brake cylinder device 2 applied to the embodiment 1, a rotation prevention part 5 is established to prevent the latch lock pin 51 from rotating around the advance and retreat directions of said latch lock pin 51. With this action, rotation of the latch lock pin 51 due to some reason, or loss of engagement with the push-up part 49*d* of the latch member 49 or with the tapered surface 51*a* of the latch lock pin 51 can be prevented, and failure of the latch member 49 to operate correctly can be avoided.

In addition, in the brake cylinder device 2, since a fall prevention part 6 is established as described above, rotation of the latch lock pin 51 due to the latch lock pin 51 falling from the guide part 23*c* can be prevented. Therefore, correct movement of the latch member 49 can be more firmly ensure.

In addition, in the brake cylinder device 2, an extension part 59 is positioned as the fall prevention part 6 so as to overlay the latch lock pin 51 in the advance and retreat directions of the said latch lock pin 51. With this action, array in a direct series of the fall prevention part 6 and the latch lock pin 51 is prevented. Therefore, the size of the brake cylinder device 2 in the advance and retreat directions of the latch lock pin 51 can be compacted.

In addition, in the brake cylinder device, for example, if a fall prevention part is formed in the second piston, when the second piston advanced in the brake activation direction there would be incidents where the latch lock pin 51 was pressured by the fall prevention part. In other words, in cases where pressure on the latch lock pin was not originally necessary there were concerns that the latch lock pin would be pressured.

In response to this, in the brake cylinder device 2, since the extension part 59 of the spring seat 57 receiving the second position adjustment spring 47*b* is established as the fall prevention part 6, pressuring the latch lock pin 51 by mistake due to the advance state of the second piston 35 can be avoided. In other words, in this configuration the fall prevention part can be established in a suitable part.

In addition, in the brake cylinder device 2, for example, there are no major shape changes performed for the brake cylinder device disclosed in the above-mentioned Patent Documentation 1 and correct engagement between the latch member 49 and the latch lock 51 can be ensured. Specifically, in the brake cylinder device 2, the shape of the latch lock pin 51 and the spring seat 57 can be partially changed for the brake cylinder device in the Patent Documentation 1, and since there is no need for changing the shapes of relatively large parts such as the cylinder 23, etc., the increase in additional costs for metal mold modifications, etc., can be controlled.

In addition, according to the brake device 1, a brake device 1 capable of ensuring correct engagement of the latch lock pin 51 against the latch member 49 can be provided.

Second Embodiment

Entire Configuration

Figure 6:
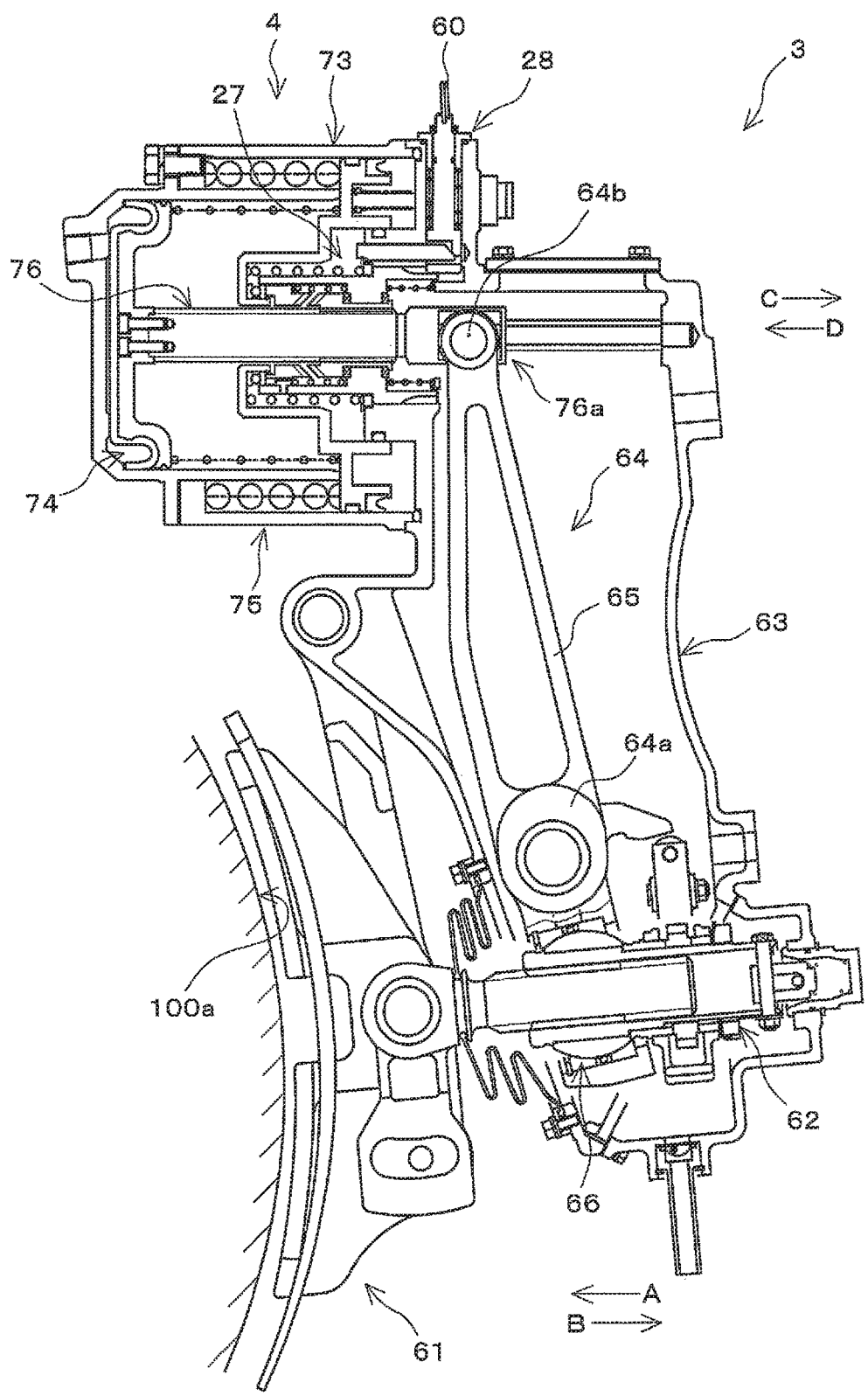
FIG. 6 Drawing including a partial cross-section of the brake device applied to the second embodiment of this invention.
Figure 7:
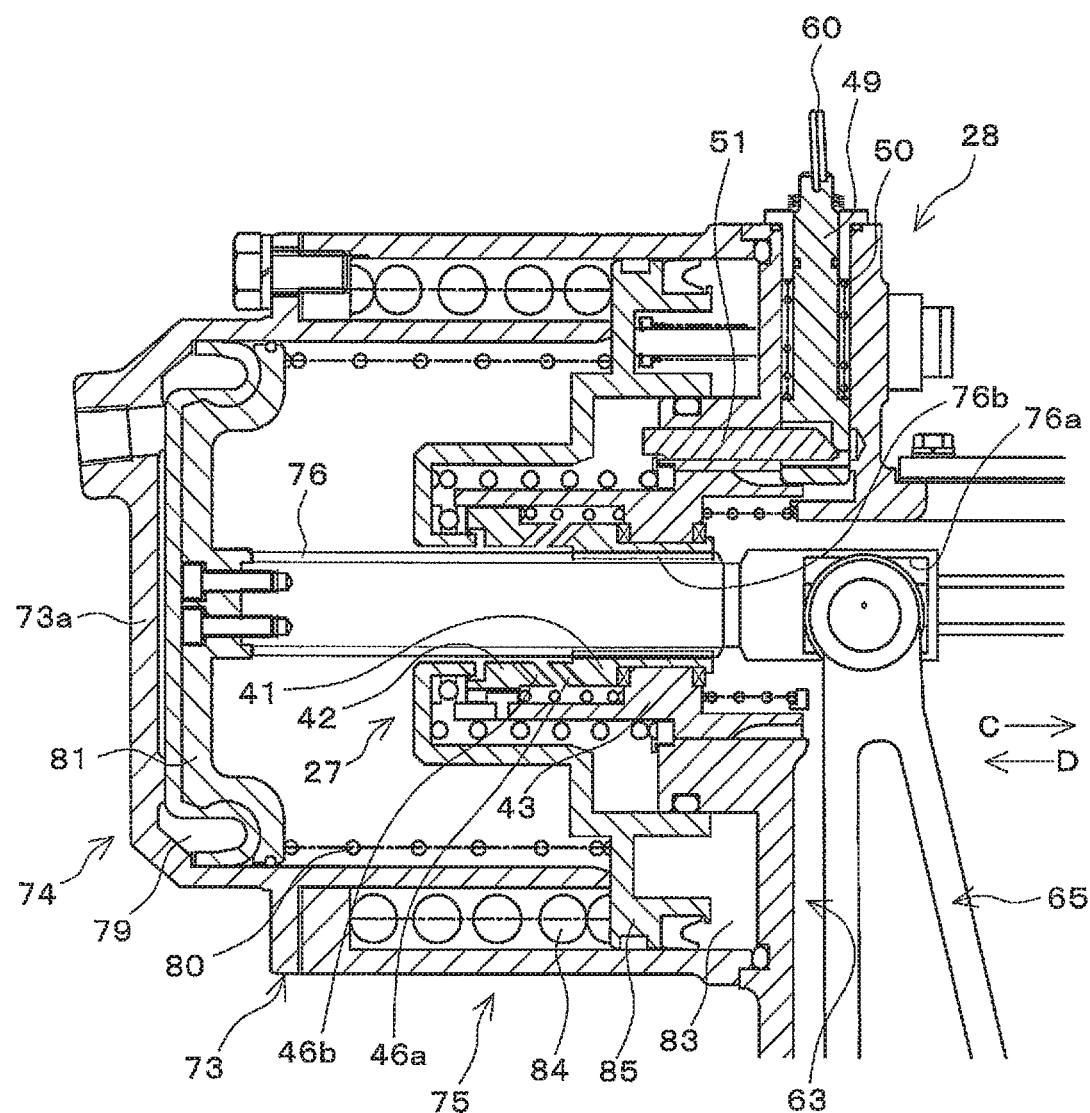
FIG. 7 Drawing showing an enlargement of part of the brake device shown in FIG. 6, and a drawing showing the brake cylinder device established in the brake device.

FIG. 6 is a drawing that includes a partial cross-section of the brake device 3 applied to the second embodiment. In addition. FIG. 7 is a drawing showing the brake cylinder device 4 of the brake device 3. Note that in FIG. 6, the hatching is omitted. The brake cylinder device 3 applied to the second embodiment is equipped with the brake cylinder device 4, a brake output part 61, a rod part 62, and a brake lever 64, etc. In the brake device 3, the brake cylinder device 4 activates, and the brake lever 64 arm 65 oscillates centering around a fulcrum 64*a*. With this action, the brake output part 61 is driven by way of a spherical bearing 66 established on the front tip side of the arm 65 and the rod part 62, to output the brake force.

[Brake Cylinder Device]

The brake cylinder device 4 applied to the second embodiment is configured to be equipped with a cylinder 73, a fluid brake mechanism 74, a parking spring brake mechanism 75, a spindle 76 (brake force transmission part), a transmission mechanism 27 (clutch mechanism), and a lock mechanism 28, etc. The brake cylinder device 4 applied to the second embodiment also, similar to how the brake cylinder device 2 applied to the first embodiment, both the fluid brake mechanism 74 that activates as a pressure fluid when supply and exhaust of compressed air is performed and the parking spring brake mechanism 75 are configured as activation-capable devices.

Note that the brake cylinder device 4 applied to the second embodiment, as compared with the brake cylinder device 2 applied to the first embodiment, differs greatly in the configuration and positioning relationship of the two brake mechanisms 74, 75. Specifically, where in the brake cylinder device 2 applied to the first embodiment, the two mechanisms 24, 25 are positioned so as to form a series in the brake activation direction; in the brake cylinder device 4 applied to the second embodiment, the two brake mechanisms 74, 75 are positioned to overlay in the brake activation direction. In other words, the brake cylinder device 4 applied to the second embodiment is configured so as to shorten the total length of the device.

Here below, the description is mainly about the portions (cylinder 73, fluid brake mechanism 74, parking spring brake mechanism 75, spindle 76, etc.) where the configuration differs greatly compared with the above-mentioned embodiment 1, and description of other portions is omitted.

The cylinder 73 is formed from a combination of multiple members into an approximately bottomed cylindrical shape. In the opening part of the cylinder 73, a case 63 housing the above-mentioned rod part 62 and brake lever 64, etc., is mounted. In the cylinder 73 is housed the fluid brake mechanism 74, the parking spring brake mechanism 75, the spindle 76, and the transmission mechanism 27, etc.

The fluid brake mechanism 74, in the same way as the first embodiment, is established as an ordinary brake mechanism used for brake operations during railway car operations. The fluid brake mechanism 74 is configured to be equipped with the first compression chamber 79, the first spring 80, and the first piston 81, etc.

The first compression chamber 79 is divided by a bottom part 73*a* of the cylinder 73, and the first piston 81. The first spring 80 has one end side contacting a portion on the opposite side of the first compression chamber 79 in the first piston 81, and the other end side contacting the second piston 85. With this action, the first spring 80 biases the first piston 81 in the direction opposite to the brake activation direction (FIG. 7 arrow D direction) against the second piston 85. To enable advance and retreat in line with the cylindrical axis direction of the cylinder 73, the first piston 81 is housed inside the said cylinder 73 so as to be opposed to the bottom part 73*a* of the said cylinder 73. The first piston 81 uses supply of compressed air to the first compression chamber 79 to move in the brake activation direction (FIG. 7 arrow C direction) in resistance to bias force due to elastic recovery of the compressed first spring 30. In addition, on the surface of the brake activation direction side in the first piston 81, the spindle 76, positioned so as to be on the same axis as the cylindrical axis of the cylinder 73, is fixed by a bolt.

The parking spring brake mechanism 75, in the same way as the first embodiment, is established as a parking brake mechanism used for maintaining the braking state during railway car parking. The parking spring brake mechanism 75 is configured to be equipped with the second compression chamber 83, the second spring 84, and the second piston 85, etc.

The second compression chamber 83 is divided by a portion covering the opening part of the cylinder 73 in the case 63, and by the second piston 85. The second spring 84 has one end side contacting the cylinder 73, and the other end side contacting the second piston 85. The second spring 84 biases the second piston 85 in the brake activation direction (FIG. 7 arrow C direction) against the cylinder 73. The second piston 73 is housed in a region farther along the brake activation side than the first piston 81 inside the cylinder 73, so as to enable advance and retreat along the cylindrical axis direction of the cylinder 73.

The spindle 76 is an approximately bar-shaped member positioned so as to extend along the brake activation direction. The spindle 76 has one end (the end on the brake release direction side) fixed to the first piston 81, and an opening part 76*a* formed on the other end. A force point 64*b* formed on one end of the arm 65 of the brake lever 64 is inserted into this opening part 76*a* to freely slide. In addition, a screw part 76*b* is formed in side portion of the opening part 76*a* on the outer circumferential surface of the spindle 76.

The spindle 76 moves toward the brake activation direction (FIG. 6 arrow C direction) in line with activation when the brake force of the brake cylinder device 4 is output. In so doing, the force point part 64*b* of the arm 65 that was inserted to freely slide inside the opening part 76*a* of the spindle 76 also moves in the brake activation direction. With this action, the spherical bearing 66 that was established on the side opposite to the force point 64*b* of the arm 65 moves in the arrow A direction in FIG. 6, and braking force is generated from the brake output part 61.

The transmission mechanism 27 is established as a mechanism for transmitting to the spindle 76 the bias force in the second piston 85 brake activation direction, in the parking spring brake mechanism 75. The transmission mechanism 27 is equipped with the screw part 76*b*, the clutch wheel 41, the clutch sleeve 42, and the clutch box 43, etc. The transmission mechanism 27 operates in the same way as in the first embodiment.

Figure 8:
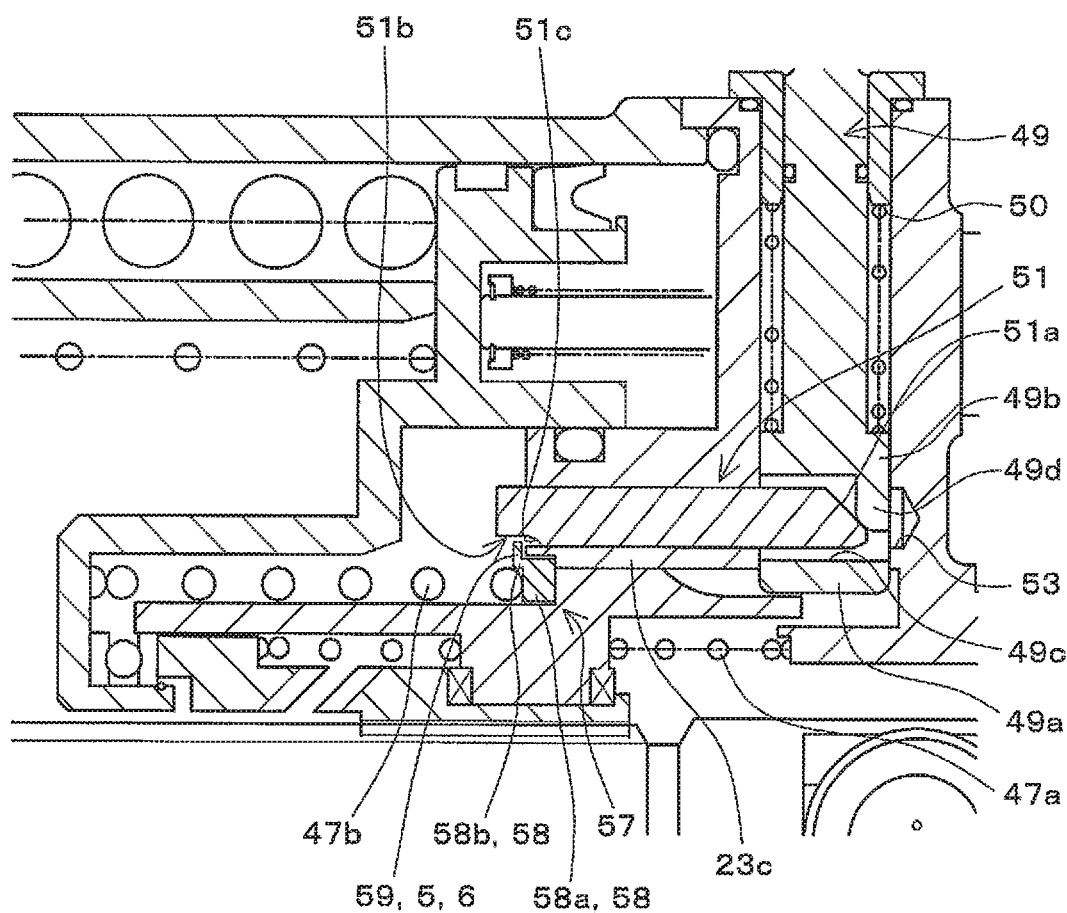
FIG. 8 Drawing showing enlargement of part of FIG. 7, and enlarged drawing of the area around the lock mechanism.

FIG. 8 is a drawing showing enlargement of part of FIG. 7, and an enlarged drawing of the area around the lock mechanism 28. As shown in FIG. 7 and FIG. 8, the lock mechanism 28 is, in the same way as the above-mentioned embodiment 1, equipped with a latch member 49, a latch bias spring 50, a pull wheel 60, and latch lock pin 51, etc. The lock mechanism 28 operates in the same way as in the first embodiment.

[Rotation Prevention Part and Fall Prevention Part]

The brake cylinder device 4 applied to the second embodiment, in the same way as the case with embodiment 1, is also equipped with a rotation prevention part 5 and fall prevention part 6 configured in the extension part 59 of the spring seat 57. For the extension part 59 as the rotation prevention part 5, in the same way as the case with embodiment 1, even if the latch lock pin 51 rotates around the advance and retreat direction of the said latch lock pin 51 against the guide part 23*c*, the outer fringe of the extension part 59 contacts the notch part 61*b* of the latch lock pin 51. With this action, rotation of the latch lock pin 51 is prevented. In addition, for the extension part 59 as the fall prevention part 6, in the same way as the case with embodiment 1, even if the latch lock pin 51 falls from the guide part 23*c*, the latch lock pin 51 fall is prevented because the latch lock pin 51 catches on the extension part 59.

As shown above, even with the brake device 3 and brake cylinder device 4 applied to the this embodiment, in the same way as the case with the above-mentioned embodiment 1, the rotation and fall of the latch lock pin 51 is prevented, ensuring normal operation of the latch member 49.

Modification Examples

The above was a description about the first and second embodiments for this invention, but this invention is not limited to the above-mentioned embodiments, and various changes and implementations can be performed as long as they are listed within the scope of the claims. For example, the following Modification Examples could be implemented.

Figure 9:
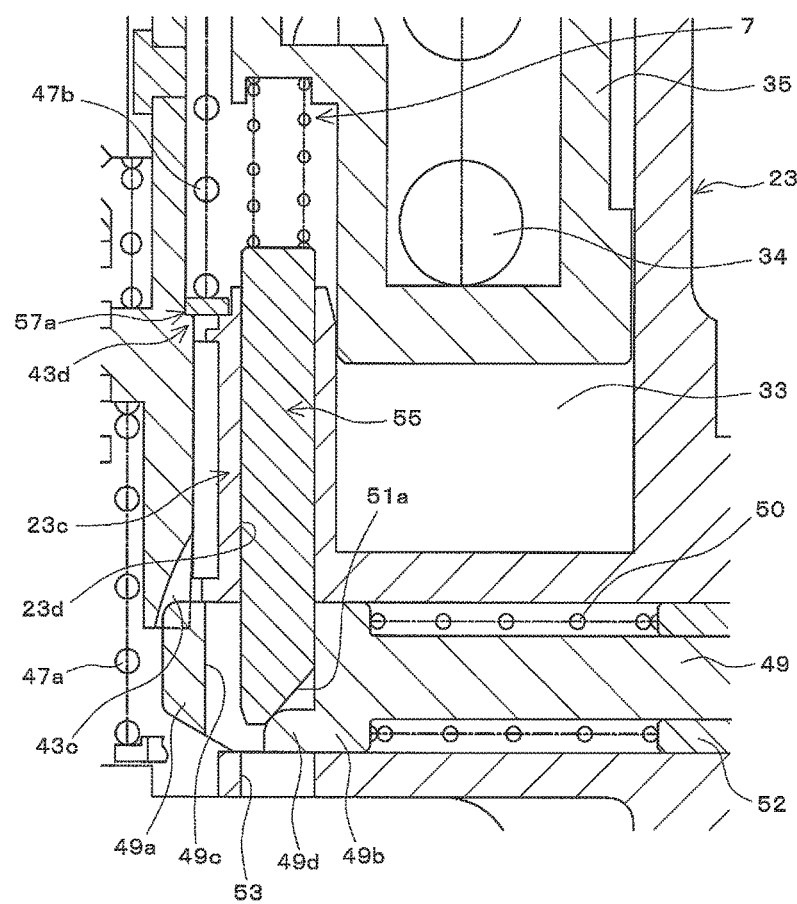
FIG. 9 Cross-section drawing expanding part of the brake cylinder device applied to an example modification.

FIG. 9 is a cross-section drawing showing an enlargement of part of the brake cylinder device applied to the Modification Example. In this Modification Example, unlike the cases in the above-mentioned embodiment, the configuration has omitted the extension part 59 of the spring seat 57, and the notch part 51*b* of the latch lock pin 51. In addition, in this Modification Example, the rotation prevention part and fall prevention part are configured in the coil spring 7.

The coil spring 7 is positioned so that one end side contacts the tip of the brake activation direction side in the second piston 35, and the other end side contacts the latch lock pin 51. When in the state where the second piston is positioned farthest in the brake release direction within the cylinder 23, the coil spring 7 is set to a length that pressures the latch lock pin 51 in the brake activation direction. With this action, the rotation and fall of the latch lock pin 51 can be prevented because the latch lock pin 51 is biased in a direction that does not fall from the guide part 23*c*.

(2) In the above-mentioned embodiments, while both the rotation prevention part 5 and the fall prevention part 6 are established in the brake cylinder devices 2, 4, configurations are not limited to this, as establishment of the rotation prevention part 5 is also acceptable. For example, in the latch lock pin 51, a groove part may also be formed extending in the long direction of the said latch lock pin 51, and a protruding part formed in the spring seat 57 as a rotation prevention part 5 that protrudes toward the inner part of the above-mentioned groove part. With this action, even if the latch lock pin 51 rotates, the rotation of the latch lock pin 51 can be prevented by the protrusion part catching on the groove part of the latch lock pin 51. Note that the above-mentioned protrusion part is not limited to the spring seat 57, but may also be formed in the guide part 23c.

(3) In the above-mentioned embodiments, while the latch lock pin 51 is formed as approximately bar-shaped, or in other words, the shape of the axial right-angle cross-section is circle-shaped, it need not be limited to this, but can also, for example, be formed in a rectangular shape, a polygonal shape, or an elliptical shape, etc. In this case, the shape of the guide part may be formed to match these shapes. For example, if the latch lock pin is formed in a squared bar shape, the shape of the guide part can be formed in a rectangular shape that enables the said squared-bar shaped latch lock pin to slide. If this is done, the rotation of the latch lock pin can be prevented by having the guide part function as a rotation prevention part.

INDUSTRIAL APPLICABILITY

This invention can be widely applied for brake cylinder devices having a parking spring brake mechanism used during car parking, and for brake devices equipped with these brake cylinder devices.

EXPLANATION OF REFERENCES 1, 3 Brake device
2, 4 Brake cylinder device
5 Rotation prevention part
6 Fall prevention part
7 Coil spring (rotation prevention part, fall prevention part)
11, 61 Brake output part
14 Rod drive part (brake force transmission part)
23 Cylinder
23c Guide part
25 Parking spring brake mechanism
27, 77 Transmission mechanism (clutch mechanism)
34 Second spring (parking spring)
35 Second piston (piston)
49 Latch member
49d Push-up part (protrusion part)
51 Latch lock pin (latch lock member)
51a Tapered surface (inclined part)
76 Spindle (brake force transmission part)
100a Tread surface (pressured part)

The invention claimed is:
1. A brake cylinder device comprising:
a parking spring brake mechanism used during car parking comprising: a cylinder,
a piston housed in the cylinder, and
a parking spring biasing the piston in a brake activation direction; a brake force transmission part configured to transmit bias force of the piston to a brake force part pressuring a pressured part of a brake target;
a clutch mechanism configured to transmit or block the bias force of the piston to the brake force transmission part;
a latch member having a front tip, an opening, and a protrusion part protruding in an advancing direction partially obstructing the opening;
a latch lock member at least partially disposed in the opening of the latch member, the latch lock member having an inclined part engageable with the protrusion part of the latch member;
a guide part in sliding contact with the latch lock member such that the latch lock member can slide in an advanced direction and a retreated direction within the guide part;
a rotation prevention part preventing the latch lock member from rotating relative to the guide part about an axis parallel to the advanced direction;
a first position adjustment spring biasing the clutch mechanism in an opposite direction of the brake activation direction against the cylinder;
a second position adjustment spring biasing the clutch mechanism in the brake activation direction against the piston; and
a spring seat comprising a receiver part configured to receive a tip of the second position adjustment spring, and a fall prevention part extending from the receiver part and configured to prevent the latch lock member from falling from the guide part,
wherein the latch member is moveable between an advanced state in which the front tip engages the clutch mechanism and prevents rotation of the clutch mechanism relative to the cylinder, and a retreated state in which the latch member disengages the clutch mechanism and permits rotation of the clutch mechanism relative to the cylinder,
wherein in the advanced state of the latch member, the latch lock member rests on the protrusion part of the latch member,
wherein in the retreated state of the latch member, the latch lock member advances in the brake activation direction through the opening of the latch member and into a relief hole, and the inclined part of the latch lock member pressures the latch member in a retreated direction;
wherein the latch member regulates a relative displacement against the piston in the brake force transmission part if the parking spring brake mechanism is activated while the latch member is in the advanced state, and
wherein the latch member permits relative displacement against the piston in the brake force transmission part if the parking spring brake mechanism is activated while the latch member is in the retreated state.

2. The brake cylinder device of claim 1, further comprising: a fall prevention part configured to prevent the latch lock member from falling from the guide part.

3. The brake cylinder device of claim 2, wherein the fall prevention part is positioned so that it overlays the latch lock member in the advanced direction and the retreated direction of the latch lock member.

4. A brake device comprising the brake cylinder device of claim 1; and a brake output part using the bias force of a piston in the brake cylinder device to pressure the pressured parts of the brake target.

* * * * *